United States Patent
Lee et al.

(10) Patent No.: US 12,351,509 B2
(45) Date of Patent: * Jul. 8, 2025

(54) WINDOW AND METHOD OF MANUFACTURING THE SAME

(71) Applicant: Samsung Display Co., Ltd., Yongin-si (KR)

(72) Inventors: Hoikwan Lee, Suwon-Si (KR); Minki Kim, Hwaseong-Si (KR); Byeong-Beom Kim, Asan-Si (KR); Seungho Kim, Asan-Si (KR); Yuri Kim, Guri-Si (KR); Jonghoon Yeum, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 787 days.

This patent is subject to a terminal disclaimer.

(21) Appl. No.: 17/296,255

(22) PCT Filed: Apr. 23, 2019

(86) PCT No.: PCT/KR2019/004927
§ 371 (c)(1),
(2) Date: May 24, 2021

(87) PCT Pub. No.: WO2020/145457
PCT Pub. Date: Jul. 16, 2020

(65) Prior Publication Data
US 2022/0098097 A1    Mar. 31, 2022

(30) Foreign Application Priority Data

Jan. 10, 2019  (KR) .................. 10-2019-0003422

(51) Int. Cl.
C03C 23/00    (2006.01)
C03C 3/097    (2006.01)
C03C 21/00    (2006.01)

(52) U.S. Cl.
CPC .......... *C03C 23/0075* (2013.01); *C03C 3/097* (2013.01); *C03C 21/002* (2013.01)

(58) Field of Classification Search
None
See application file for complete search history.

(56) References Cited

U.S. PATENT DOCUMENTS 6,568,995 B1   5/2003  Mitani et al.
7,040,953 B2   5/2006  Matsuno et al.
(Continued)

FOREIGN PATENT DOCUMENTS

CN    101939267    1/2011
CN    104951118    9/2015
(Continued)

OTHER PUBLICATIONS

WO-2013067954-A1 Machine Translation by Clarivate Analytics Retrieved Mar. 5, 2024. (Year: 2024).*
(Continued)

*Primary Examiner* — Lisa L Herring
(74) *Attorney, Agent, or Firm* — CANTOR COLBURN LLP

(57) ABSTRACT

A window including glass configured to protect an electronic panel from an external impact and a manufacturing method therefor include a base substrate having a front surface and a rear surface; and a bezel layer disposed on the rear surface of the base substrate, wherein the front surface of the base substrate has a roughness ranging from 0.2 nm to 3 nm, and at least a portion of the base substrate may be bent.

19 Claims, 20 Drawing Sheets

(56) References Cited

U.S. PATENT DOCUMENTS

| | | |
|---|---|---|
| 8,367,208 B2 | 2/2013 | Glaesemann et al. |
| 9,801,297 B2 | 10/2017 | Amin et al. |
| 10,409,331 B2 | 9/2019 | Park |
| 10,450,226 B2 | 10/2019 | Kashima et al. |
| 10,986,744 B2 | 4/2021 | Yeum et al. |
| 11,708,301 B2* | 7/2023 | Lee .................. B24B 1/00 216/31 |
| 2013/0220973 A1* | 8/2013 | Doi .................. C09G 1/02 216/53 |
| 2015/0273785 A1 | 10/2015 | Lee |
| 2015/0336843 A1* | 11/2015 | Gomez ............. C03C 11/005 65/30.14 |
| 2016/0130179 A1* | 5/2016 | Kashima ............. G01B 5/28 428/141 |
| 2017/0313620 A1 | 11/2017 | Kashima et al. |
| 2017/0313621 A1* | 11/2017 | Kashima ............. C03C 15/00 |
| 2018/0046220 A1 | 2/2018 | Kim et al. |
| 2018/0257982 A1 | 9/2018 | Lee et al. |
| 2018/0352664 A1 | 12/2018 | Park et al. |
| 2020/0102243 A1* | 4/2020 | Li .................. C03C 3/097 |
| 2021/0171391 A1* | 6/2021 | Kim .................. C03C 15/00 |

FOREIGN PATENT DOCUMENTS

| | | | | |
|---|---|---|---|---|
| CN | 106068492 | 11/2016 | | |
| CN | 107434361 | 12/2017 | | |
| CN | 108074489 | 5/2018 | | |
| CN | 108290770 | 7/2018 | | |
| CN | 108986660 | 12/2018 | | |
| JP | 2001002451 | 1/2001 | | |
| JP | 3956587 | 8/2007 | | |
| JP | 4185266 | 11/2008 | | |
| JP | 4326825 | 9/2009 | | |
| JP | 2016216295 | 12/2016 | | |
| KR | 20100120683 | 11/2010 | | |
| KR | 20150087224 | 7/2015 | | |
| KR | 101821901 | 1/2018 | | |
| KR | 20180083907 | 7/2018 | | |
| KR | 20180084674 | 7/2018 | | |
| WO | WO-2013067954 A1 * | 5/2013 | ............. | C03C 19/00 |
| WO | WO-2017087432 A1 * | 5/2017 | ............. | B32B 17/06 |

OTHER PUBLICATIONS

International Search Report dated Oct. 10, 2019 in International Application No. PCT/KR2019/004927.

Extended European Search Report dated Sep. 8, 2022, issued in European Patent Application No. 19909556.3.

* cited by examiner

WINDOW AND METHOD OF MANUFACTURING THE SAME

CROSS REFERENCE TO RELATED APPLICATION

This application is a National Stage Entry of International Application No. PCT/KR2019/004927, filed on Apr. 23, 2019, and claims priority from and the benefit of Korean Patent Application No. 10-2019-0003422, filed on Jan. 10, 2019, which is hereby incorporated by reference for all purposes as if fully set forth herein.

BACKGROUND

Field

Embodiments of the invention relate generally to a window and a method of manufacturing the same, and, more specifically, to a window including glass and a method of manufacturing the same.

Discussion of the Background

Electronic devices include windows, housing units, and electronic elements. The electronic elements may include various elements such as display elements, touch elements, or detection elements which are activated in response to electrical signals.

The windows protect the electronic elements and provide users with active areas. Accordingly, the users provide inputs to the electronic elements through the windows or receive information generated in the electronic elements. Also, the electronic elements may be stably protected from external impact by the windows.

Recently, in response to the trend toward slimmer electronic devices, the windows have also been desired to be lightweight and thin, and in order to compensate for resultant structural vulnerability, a variety of methods for strengthening the windows have been researched.

The above information disclosed in this Background section is only for understanding of the background of the inventive concepts, and, therefore, it may contain information that does not constitute prior art.

SUMMARY

The purpose of the present invention is to provide a chemically strengthened window and a method of manufacturing the same.

Additional features of the inventive concepts will be set forth in the description which follows, and in part will be apparent from the description, or may be learned by practice of the inventive concepts.

A window according to an embodiment of the present invention includes a base substrate including a front surface and a rear surface; and a bezel layer disposed on the rear surface of the base substrate, wherein the front surface has a roughness in a range of 0.2 nm to 3 nm.

The base substrate may include glass.

The base substrate may include a lithium oxide ($Li_2O$).

The base substrate may further include a phosphorus oxide ($P_2O_5$).

Compressive stress may be applied within a range from the front surface to a predetermined depth in a thickness direction of the base substrate.

A predetermined bending axis may be defined, which extends in a direction crossing a thickness direction of the base substrate, and at least a portion of the base substrate may be bending about the bending axis.

A method of manufacturing a window according to an embodiment of the present invention includes a operation of providing an initial window which includes glass and includes a lithium oxide; and a washing operation of washing the initial window, wherein the washing operation includes an acid washing operation of providing the initial window into an acidic environment; and a base washing operation of providing the initial window, which has been subjected to the acid washing operation, into a basic environment.

The acidic environment may have a pH of 2 or lower.

The acidic environment may include an acidic solution including at least one of nitric acid ($HNO_3$), sulfuric acid ($H_2SO_4$), or hydrochloric acid (HCl).

The acid washing operation may be performed for about 20 minutes at a temperature of 60° C. to 65° C.

The basic environment may have a pH of 13 or higher.

The basic environment may include a basic solution including at least one of sodium hydroxide (NaOH) or potassium hydroxide (KOH).

The window, which has been subjected to the acid washing operation, may include a first layer which includes an alkali metal and silicon that has a predetermined content ratio with respect to the alkali metal; and a second layer which is formed on a surface of the first layer and has a higher silicon content ratio than the first layer.

The second layer may be formed at a portion of the initial window, from which the alkali metal is eluted out during the acid washing operation.

A thickness of the second layer may be 200 nm to 500 nm.

During the base washing operation may form a window by removing the second layer from the first layer.

A surface roughness of the window may be less than or equal to a surface roughness of the initial window.

A surface roughness of the window, which has been subjected to the acid washing operation, may be greater than or equal to a surface roughness of the initial window.

The operation of proving the initial window may include the operations of providing a glass substrate; and strengthening the glass substrate, wherein the operation of strengthening includes an ion exchange treatment, and the operation of proving the initial window is to provide strengthened glass substrate.

The operation of proving the initial window may further include the operations of providing a mother substrate; forming a plurality of unit substrates by cutting the mother substrate; and chamfering side surfaces of the unit substrates, wherein the glass substrate is one of the unit substrates which have been subjected to the operation of chamfering.

A method of manufacturing a window according to an embodiment of the present invention includes the operations of chemically strengthening a glass substrate so that a first initial substrate is formed; washing the first initial substrate with an acidic solution by providing the first initial substrate into an acidic solution so that a second initial substrate is formed; and washing the second initial substrate with a basic solution by providing the second initial substrate into the basic solution so that a window is formed, wherein a roughness of the window ranges from 0.2 nm to 3 nm.

The glass substrate may include a lithium oxide.

The operation of chemically strengthening may not include potassium carbonate ($K_2CO_3$), sodium carbonate ($Na_2CO_3$), potassium bicarbonate ($KHCO_3$), sodium bicarbonate ($NaHCO_3$), potassium phosphate ($K_3PO_4$), sodium phosphate ($Na_3PO_4$), potassium sulfate ($K_2SO_4$), sodium sulfate ($Na_2SO_4$), and potassium hydroxide (KOH).

The second initial substrate may be formed by eluting out an alkali metal from the first initial substrate.

The second initial substrate may include a first layer, which has substantially the same content ratio of silicon to the alkali metal as the first initial substrate, and a second layer, which is formed on a surface of the first layer and has a higher content ratio of the silicon to the alkali metal than the first layer.

The second layer may have relatively more voids than the first layer.

The window may be formed by removing the second layer from the second initial substrate.

According to the present invention, the window having the improved strength may be provided. Also, according to the present invention, the method of manufacturing the window may be provided, which provides the strengthened window through the simplified processes.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

FIG. 3B is a microscopic image of a portion of the window illustrated in FIG. 3a.

FIGS. 11A, 111B, and 11C cross-sectional views illustrating a method of manufacturing a window according to an embodiment of the present invention.

DETAILED DESCRIPTION

Figure 1:
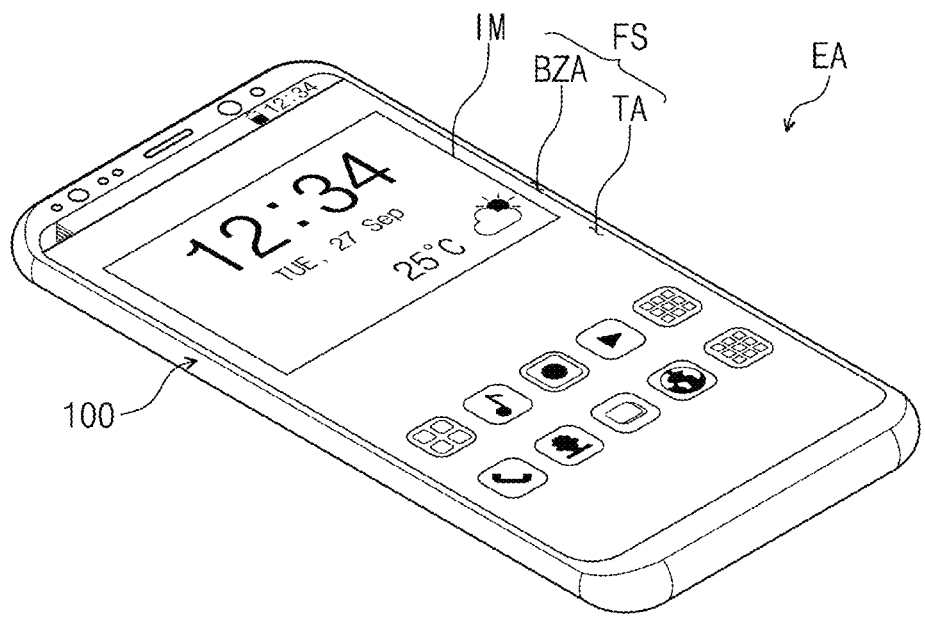
FIG. 1 is a perspective view illustrating an electronic device according to an embodiment of the present invention.
Figure 1:
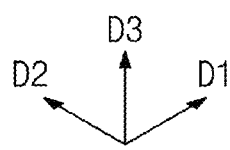

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are illustrated in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, operations, operations, elements, components, and/or groups thereof, but do not preclude the presence or addition of one or more other features, integers, operations, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Although the terms first, second, etc. may be used herein to describe various elements, these elements should not be limited by these terms. These terms are only used to distinguish one element from another element. For example, a first element may be referred to as a second element, and similarly, a second element may be referred to as a first element without departing from the scope of the present invention. The singular forms include the plural forms unless the context clearly indicates otherwise.

operationoperationHereinafter, embodiments of the present invention will be described with reference to the accompanying drawings.

Figure 2A:
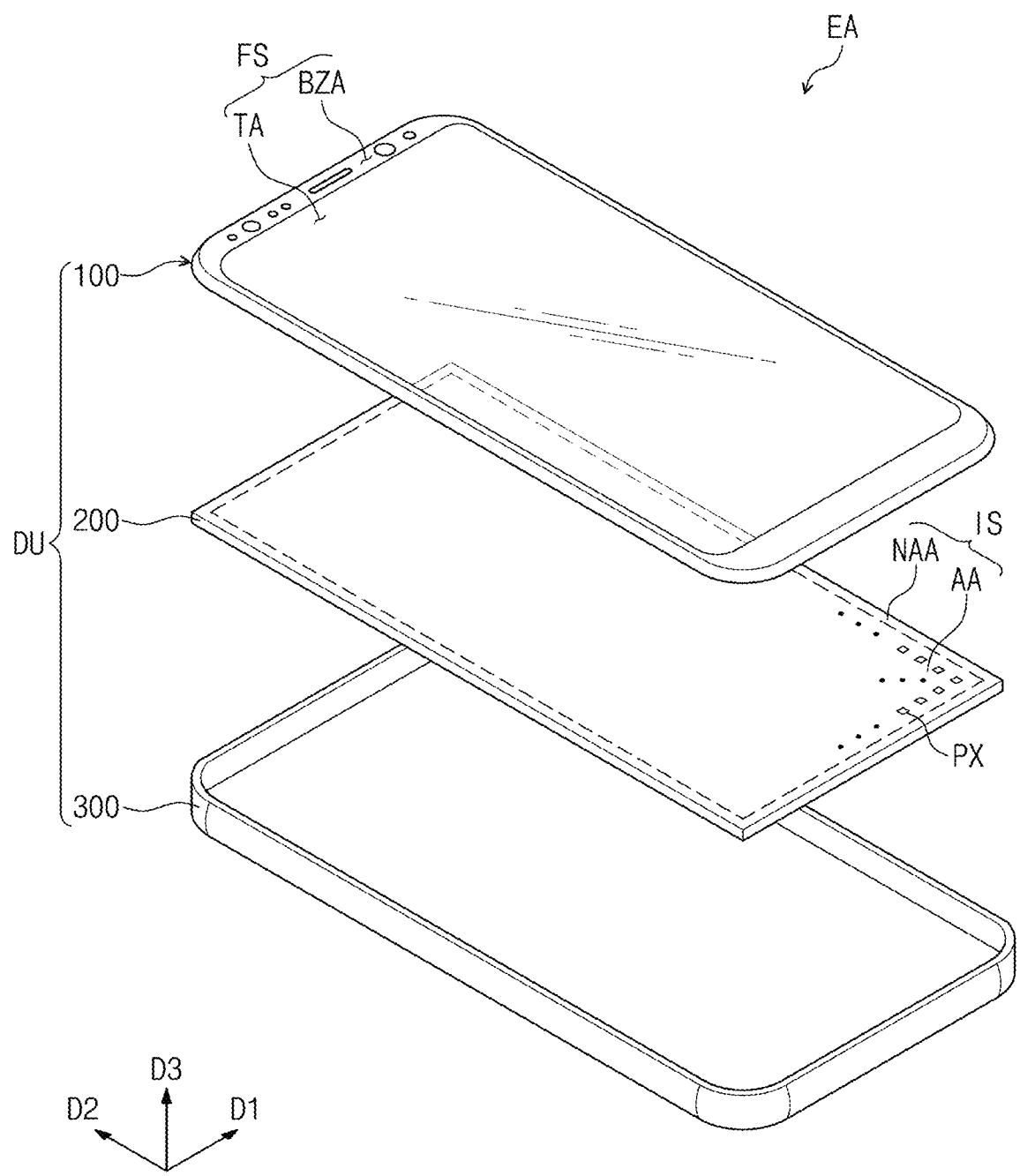
FIG. 2A is an exploded perspective view illustrating the electronic device illustrated in FIG. 1.
Figure 2B:
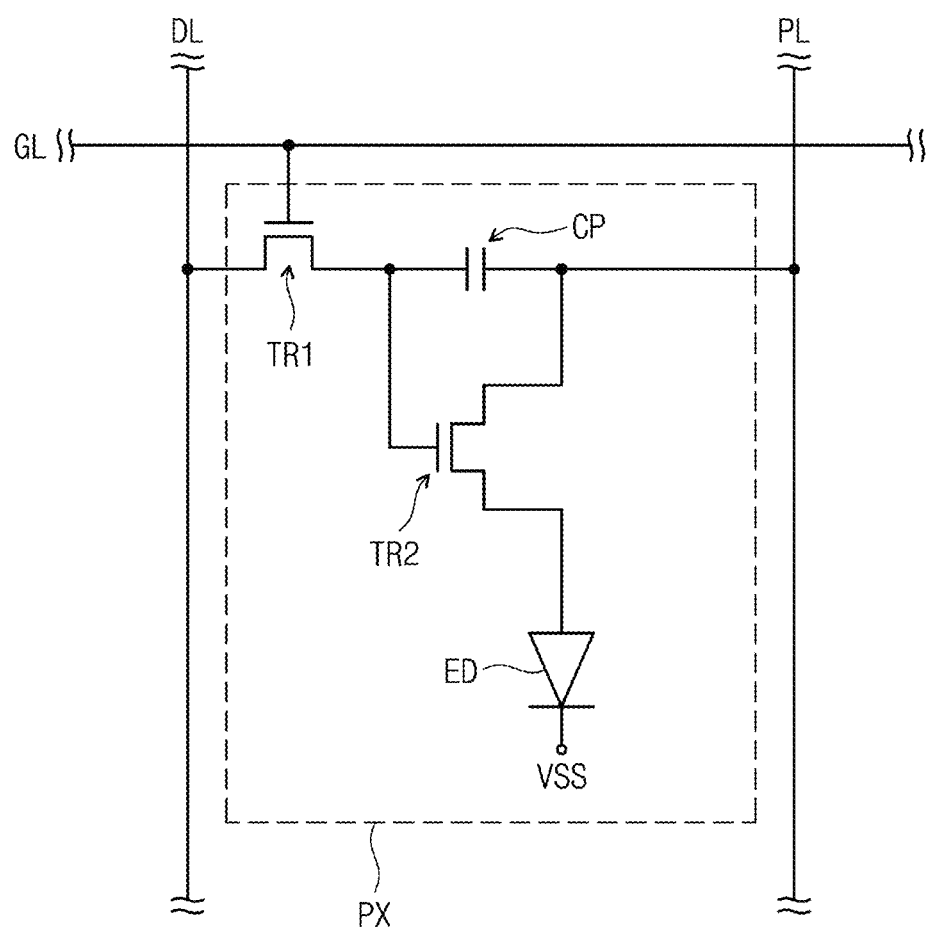
FIG. 2B is an equivalent circuit diagram illustrating some components of the electronic device.

FIG. 1 is a perspective view illustrating an electronic device EA according to an embodiment of the present invention. FIG. 2A is an exploded perspective view illustrating the electronic device illustrated in FIG. 1. FIG. 2B is an equivalent circuit diagram illustrating some components of the electronic device. Hereinafter, the present invention will be described with reference to FIGS. 1 to 2B.

The electronic device EA may be a device which is activated in response to an electrical signal. The electronic device EA may include various embodiments. For example, the electronic device EA may include a tablet, a laptop, a computer, a smart television, or the like. In the embodiment, the electronic device EA is illustratively shown as a smart phone.

The electronic device EA may display an image IM, in a third direction D3, on a display surface FS parallel to each of a first direction D1 and a second direction D2. A display surface FS, on which the image IM is displayed, may correspond to a front surface of the display device EA and may also correspond to a front surface FS of a window 100. Hereinafter, the same reference symbol is used to denote the display surface and front surface of the electronic device EA and the front surface of the window 100. The image IM may include static images as well as dynamic images. In FIG. 1, a watch and a plurality of icons are illustrated as one example of the image IM.

In the embodiment, a front surface (or a top surface) and a rear surface (or a bottom surface) for each member are defined with respect to the direction in which the image IM is displayed. The front and rear surfaces are opposed to each other in the third direction D3, and the normal direction of each of the front and rear surfaces may be parallel to the third direction D3. The distance between the front and rear surfaces in the third direction D3 may correspond to the thickness of the electronic device EA in the third direction D3. Here, directions, which are indicated as the first to third directions D1, D2, and D3, may have a relative concept and thus may be changed to other directions. Hereinafter, the first to third directions refer to the same reference symbols as the directions indicated by the first to third directions D1, D2, and D3, respectively.

The electronic device EA includes a window 100, an electronic panel 200, and a housing member 300. In the embodiment, the window 100 and the housing member 300 are coupled to each other to define an exterior of the electronic device EA.

As described above, the front surface FS of the window 100 defines the front surface of the electronic device EA. A transmissive area TA may be an optically transparent area. For example, the transmissive area TA may be an area having a visible light transmittance of about 90% or higher.

A bezel area BZA may be an area having a relatively lower light transmittance than the transmissive area TA. The bezel area BZA defines a shape of the transmissive area TA. The bezel area BZA is adjacent to the transmissive area TA and may surround the transmissive area TA.

The bezel area BZA may have a predetermined color. The bezel area BZA may cover a peripheral area NAA of the electronic panel 200 to prevent the peripheral area NAA from being viewed from the outside. However, this is merely illustrated as an example, and the bezel area BZA may be omitted in the window 100 according to an embodiment of the present invention.

The window 100 may include an insulating material. For example, the window 100 may include glass. The window 100 may provide the transmissive area TA by using the light transmittance of the glass and stably protect the electronic panel 200 from external impact by using the strength of the glass. This will be described later in detail.

The electronic panel 200 may be activated in response to an electrical signal. In the embodiment, the electronic panel 200 is activated to display the image IM through a front surface IS of the electronic panel 200. The image IM may be provided to a user through the transmissive area TA, and the user may receive information through the image IM. However, this is merely illustrated as an example, and the electronic panel 200 may be activated to detect an external input applied to the front surface. The external input may include a user's touch, contact or approach of immaterial matters, pressure, light, or heat, but the embodiment is not limited to any one embodiment.

The front surface IS of the electronic panel 200 may include an active area AA and a peripheral area NAA. The active area AA may include an area on which the image IM is displayed. The transmissive area TA may overlap the entire surface of the active area AA or at least a portion of the active area AA.

The peripheral area NAA may be an area covered by the bezel area BZA. The peripheral area NAA is adjacent to the active area AA. The peripheral area NAA may surround the active area AA. A driving circuit, a driving line, or the like configured to drive the active area AA may be disposed in the peripheral area NAA.

The active area AA of the electronic panel 200 may include a plurality of pixels PX. The pixels PX are configured to display light in response to an electrical signal. The light displayed by the pixels PX makes the image IM.

In FIG. 2B, an equivalent circuit diagram of one pixel PX is schematically illustrated for ease of description. Hereinafter, the pixel PX will now be described with reference to FIG. 2B.

The pixel PX may be connected to a plurality of signal lines. In the embodiment, the pixel PX is illustrated as being connected to a gate line GL, a data line DL, and a power line PL. However, this is merely illustrated as an example. The pixel PX according to an embodiment of the present invention may be connected to additional signal lines, which are not illustrated, and receive various electrical signals, but the embodiment is not limited to any one embodiment.

The pixel PX includes a first transistor TR1, a second transistor TR2, a capacitor CP, and a display element ED such as a light emitting element. In the embodiment, the display element ED is illustratively illustrated as an organic light emitting element. However, the configuration of the pixel PX is not limited thereto and may be variously modified and implemented.

A first thin film transistor TR1 may be a switching element configured to control an on-off state of the pixel PX.

In respond to a gate signal transmitted through the gate line GL, the first thin film transistor TR1 may transmit or block data signals transmitted through the data line DL.

The capacitor CP may be connected to the first thin film transistor TR1 and the power line PL. The capacitor CP charges a quantity of electric charge corresponding to a difference between the data signal transmitted from the first thin film transistor TR1 and a first power signal applied to the power line PL.

A second thin film transistor TR2 is connected to the first thin film transistor TR1, the capacitor CP, and the display element ED. Corresponding to the quantity of electric charge stored in the capacitor CP, the second thin film transistor TR2 controls driving current that flows through the display element ED. Depending on the quantity of electric charge charged in the capacitor CP, a turn-on time of the second thin film transistor TR2 may be determined. The second thin film transistor TR2 provides the first power signal, which is transmitted through the power line PL during the turn-on time, to the display element ED.

The display element ED may generate light or control a quantity of light depending on the electrical signal. For example, the display element ED may include an organic light emitting element, a quantum dot light emitting element, a liquid crystal capacitor, an electrophoretic device, or an electrowetting device.

The display element ED is connected to a power terminal VSS and receives a power signal (hereinafter, referred to as a second power signal) which is different from the first power signal provided from the power line PL. Driving current, which corresponds to a difference between the second power signal and the electrical signal provided from the second thin film transistor TR2, flows through the display element ED, and the display element ED may generate light corresponding to the driving current. Here, this is merely illustrated as an example. The pixel PX may include electronic elements having various configurations and arrangements, but the embodiment is not limited to any one embodiment.

Referring to FIG. 2A again, the housing member 300 is disposed below the electronic panel 200. The housing member 300 is coupled to the window 100 to define the exterior of the electronic device EA. The housing member 300 may include a material having relatively high rigidity. For example, the housing member 300 may include a plurality of frames and/or plates made of glass, plastic, and metal. The housing member 300 provides a predetermined accommodation space. The electronic panel 200 may be accommodated in the accommodation space and thus protected from the external impact.

Figure 3A:
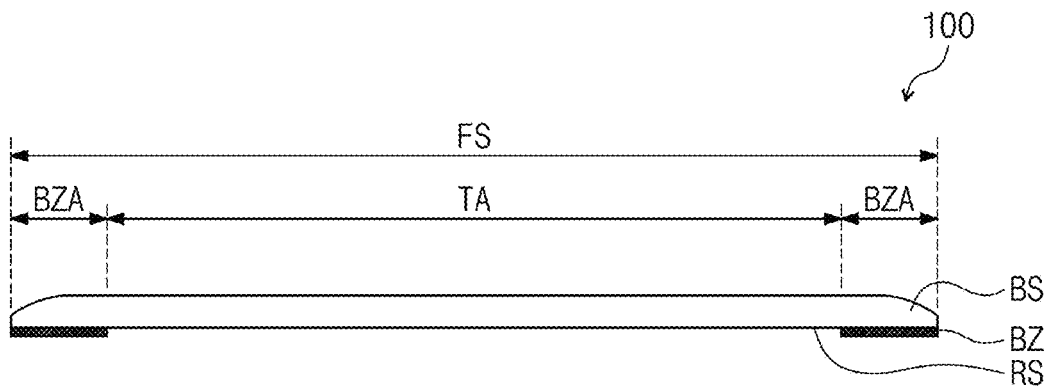
FIG. 3A is a cross-sectional view illustrating a window according to an embodiment of the present invention.
Figure 3B:
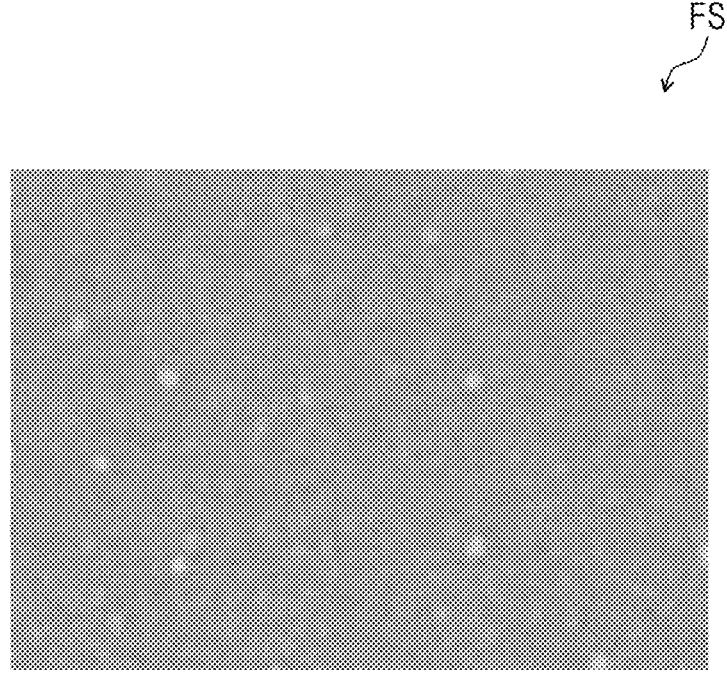

FIG. 3A is a cross-sectional view illustrating a window according to an embodiment of the present invention. FIG. 3B is a microscopic image of a portion of the window illustrated in FIG. 3A. Hereinafter, the present invention will be described with reference to FIGS. 3A and 3B.

As illustrated in FIG. 3A, a window 100 may include a base substrate BS and a bezel layer BZ. The base substrate BS may be optically transparent. In the embodiment, the base substrate BS may include glass.

A front surface FS of the base substrate BS is exposed to the outside of an electronic device EA, and defines a front surface FS of the window 100 and a front surface FS of the electronic device EA. A rear surface RS of the base substrate BS is opposed to the front surface FS in a third direction D3.

The bezel layer BZ is disposed on the rear surface RS of the base substrate BS and defines a bezel area BZA. The bezel layer BZ may have light transmittance relatively lower than that of the base substrate BS. For example, the bezel layer BZ may have a predetermined color. Accordingly, the bezel layer BZ allows only light having specific color to be selectively transmitted/reflected. Also, the bezel layer BZ may be, for example, a light blocking layer that absorbs incident light. The color of the bezel area BZA may be determined according to the light transmittance of the bezel layer BZ.

The bezel layer BZ may be formed by performing printing or deposition on the rear surface RS of the base substrate BS. Here, the bezel layer BZ may be formed directly on the rear surface RS of the base substrate BS. Alternatively, the bezel layer BZ may be coupled to the rear surface RS of the base substrate BS through a separate adhesive member or the like. Here, the adhesive member may be in contact with the rear surface RS of the base substrate BS. The bezel layer BZ may have a predetermined configuration about edges of the base substrate BS.

FIG. 3B illustrates an image of the front surface FS of the base substrate BS which is captured by a scanning electron microscope SEM. According to the present invention, the roughness of the front surface FS of the base substrate BS may be controlled to a range from about 0.2 nm to about 3 nm. Here, although not illustrated, FIG. 3B may correspond to microscopic images of the rear surface RS and side surface of the base substrate BS.

The roughness of the front surface FS and rear surface RS of the base substrate BS represents the surface roughness of the window 100. The surface roughness of the window 100 may be substantially related to the strength of the window 100 against the external impact.

Because the surface roughness of the window 100 may be used as a propagation path of cracks or the like caused by the external impact as the surface roughness is increased, the strength of the window 100 is likely to be reduced when cracks are lodged therein. According to the present invention, the window 100 having the surface roughness in a range of 0.2 nm to 3 nm is provided, and thus, the window 100 and the electronic device EA having the improved strength against the external impact may be provided.

Figure 4:
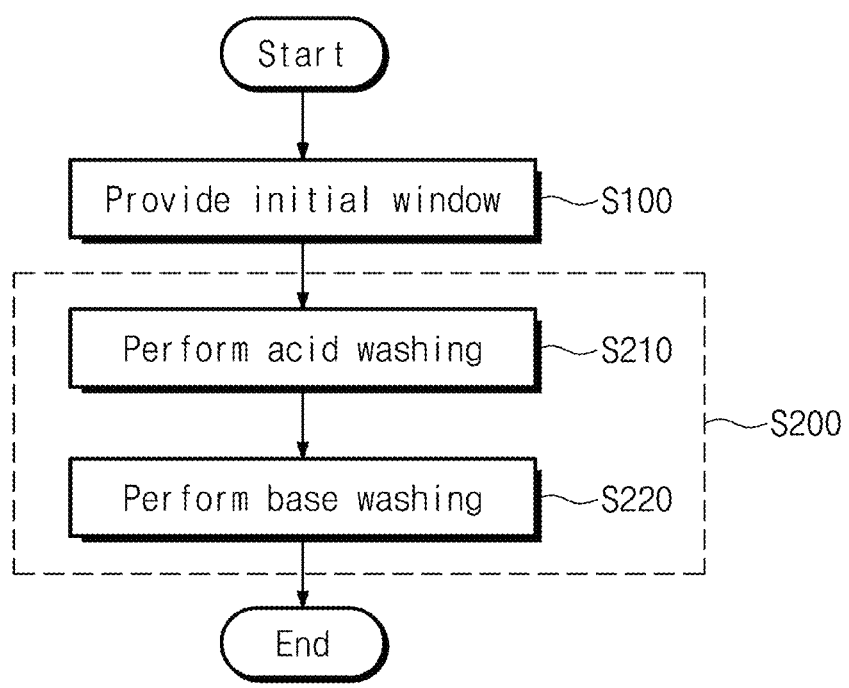
FIG. 4 is a flowchart schematically illustrating a method of manufacturing a window according to an embodiment of the present invention.
Figure 6:
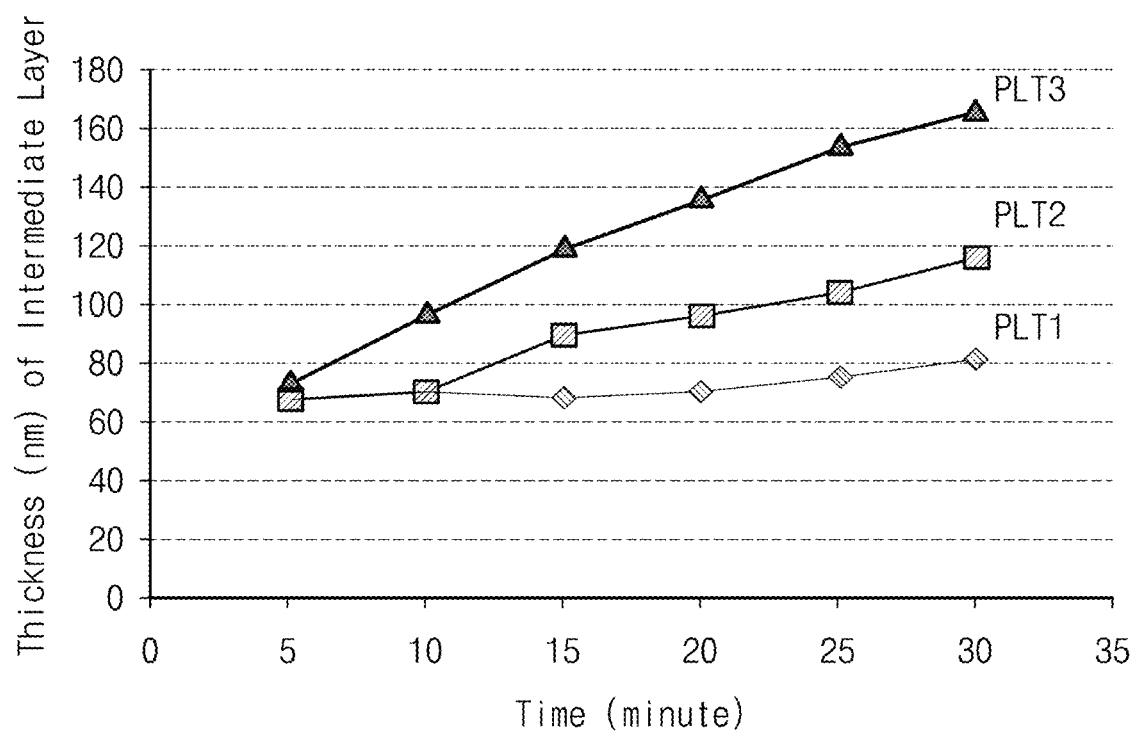
FIG. 6 is a graph illustrating a change in thickness of an intermediate layer over time during some operations in a method of manufacturing a window.
Figure 7A:
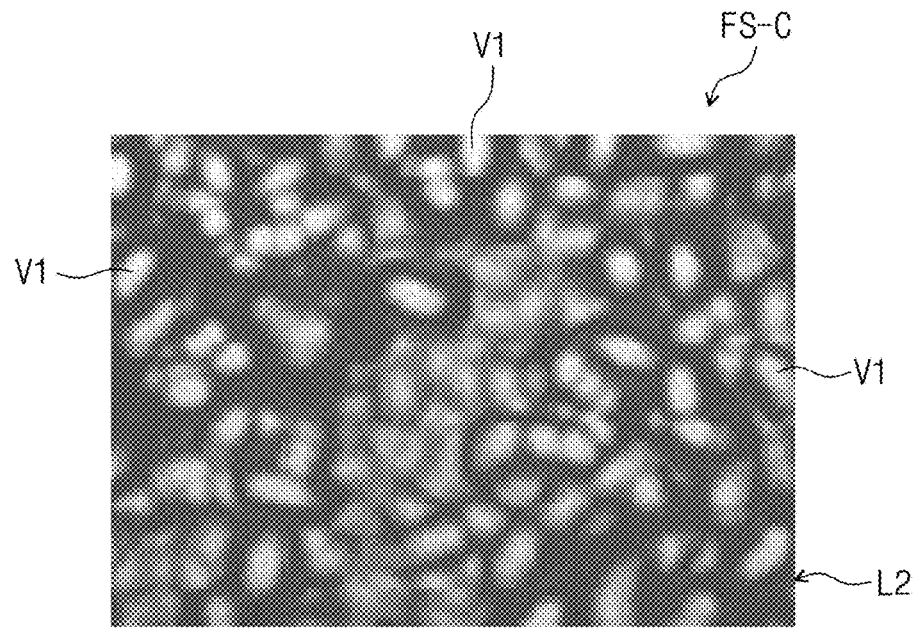
FIG. 7A is a microscopic image illustrating a surface of an intermediate window.
Figure 7B:
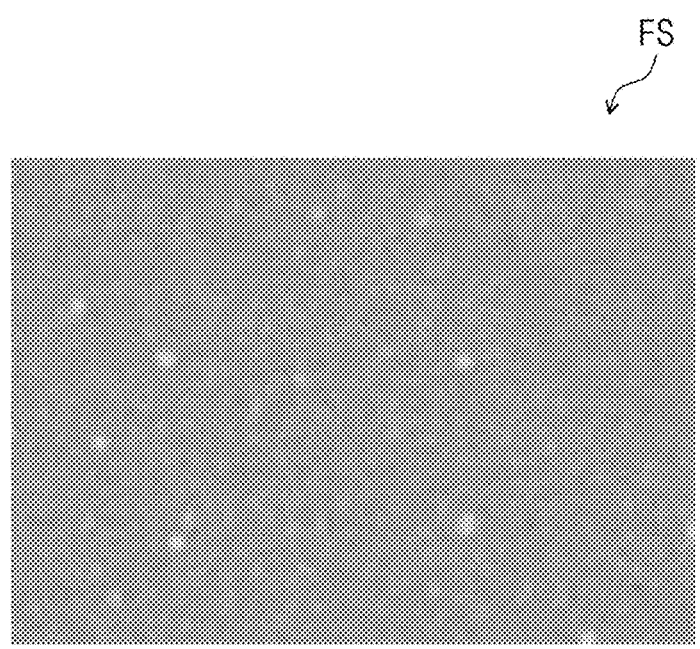
FIG. 7B is a microscopic image illustrating a surface of a window according to an embodiment of the present invention.

FIG. 4 is a flowchart schematically illustrating a method of manufacturing a window according to an embodiment of the present invention. FIGS. 5A to 5G are cross-sectional views schematically illustrating a method of manufacturing a window according to an embodiment of the present invention. FIG. 6 is a graph illustrating a change in thickness of an intermediate layer over time during some operations in a method of manufacturing a window. FIG. 7A is a microscopic image illustrating a surface of an intermediate window, and FIG. 7B is a microscopic image illustrating a surface of a window according to an embodiment of the present invention.

FIGS. 5A to 5G illustrate cross-sectional views in operations corresponding to FIG. 4. Hereinafter, the present invention will be described with reference to FIGS. 4 to 5G. Here, the same reference numerals may be given to the same components as those illustrated in FIGS. 1 to 3B, and their duplicated descriptions will be omitted.

Figure 5A:
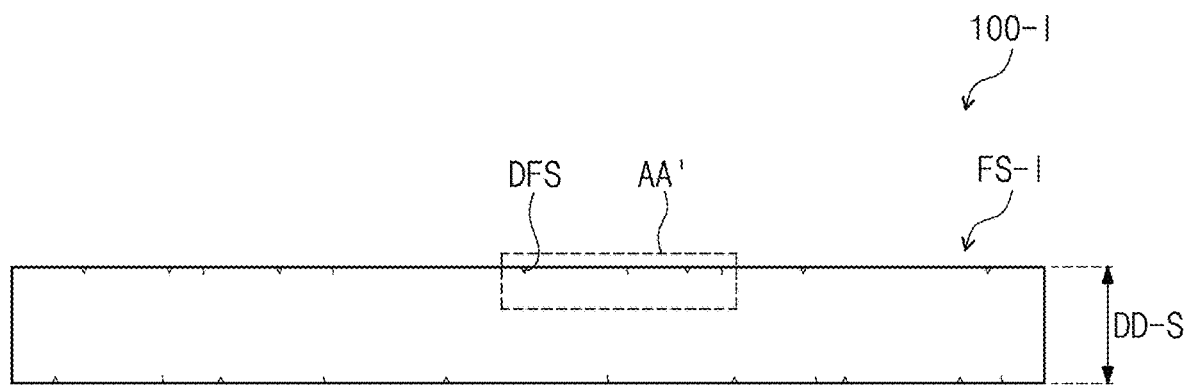
FIGS. 5A, 5B, 5C, 5D, 5E, 5F, and 5G are cross-sectional views schematically illustrating a method of manufacturing a window according to an embodiment of the present invention.
Figure 5B:
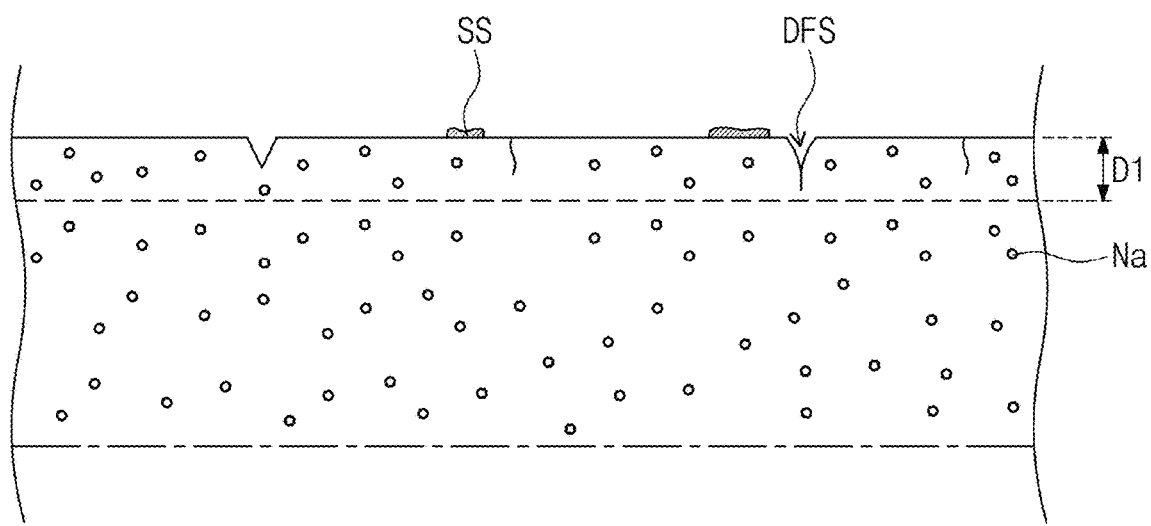

As illustrated in FIGS. 4, 5A, and 5B, an initial window 100-I is provided (S100). FIG. 5B is an enlarged view illustrating AA' of FIG. 5A for ease of description.

The initial window 100-I has a predetermined thickness DD-S. The initial window 100-I according to the embodiment may be a glass substrate that contains various inorganic materials. For example, the initial window 100-I may include at least silicon oxide ($SiO_2$), aluminum oxide ($Al_2O_3$), lithium oxide ($Li_2O$), and alkali metal oxide, for example, sodium oxide ($Na_2O$) or potassium oxide ($K_2O$), and may also include phosphorus oxide ($P_2O_5$). In the embodiment, alkali metal ions Na are illustrated as circular particles for ease of description.

Here, a surface FS-I of the initial window 100-I according to the embodiment may include a plurality of defects DFS. The defects DFS may include scratches or recesses formed in the surface FS-I of the initial window 100-I. The defects DFS may be formed due to the collision to the outside and the contact with the external environment during forming of the initial window 100-I or during moving of the initial window 100-I. The roughness of the surface FS-I of the initial window 100-I may vary according to the number or shape of the defects DFS.

In the cross-section, a thickness D1 of the initial window 100-I in which the defects DFS are formed is smaller than the thickness DD-S of the initial window 100-I. For example, the thickness D1 in which the defects DFS are formed may be about 300 nm to about 400 nm.

Here, the initial window 100-I according to the embodiment may further include predetermined foreign substances SS. The foreign substances SS may be provided while attached to the surface FS-I of the initial window 100-I. The foreign substances SS may include different materials from the initial window 100-I, and include organic materials and/or inorganic materials. Here, this is merely illustrated as an example. There may be no foreign substances SS in the initial window 100-I according to an embodiment of the present invention, and the embodiment is not limited to any one embodiment.

Figure 5C:
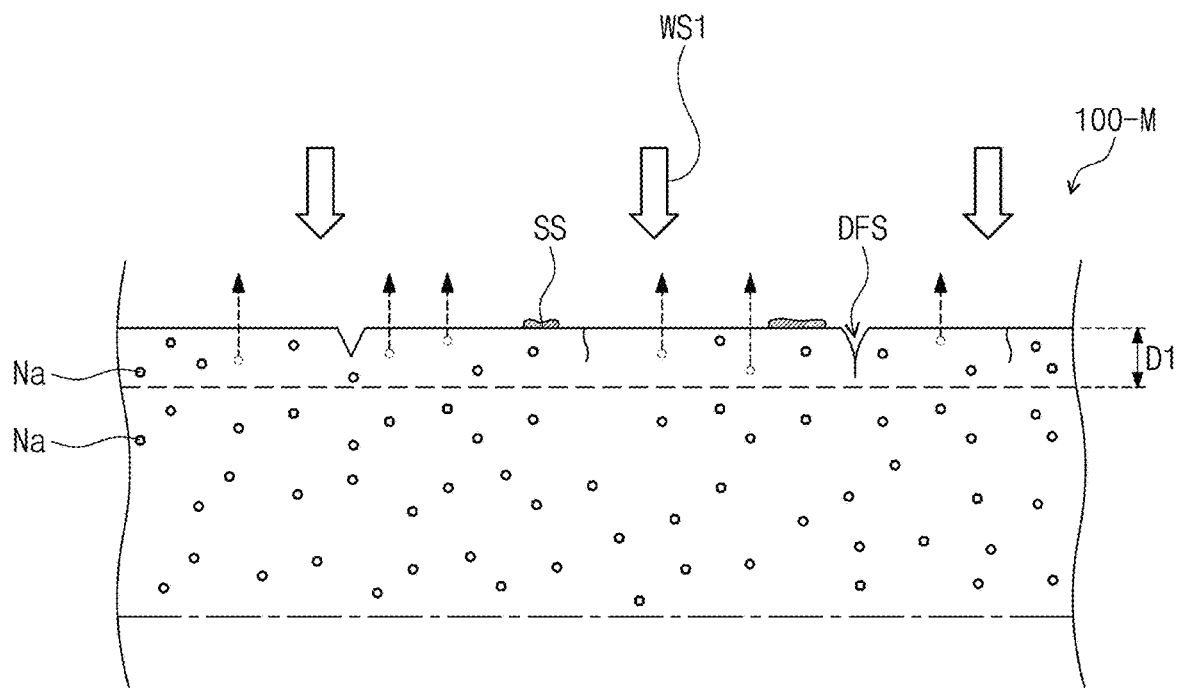
Figure 5D:
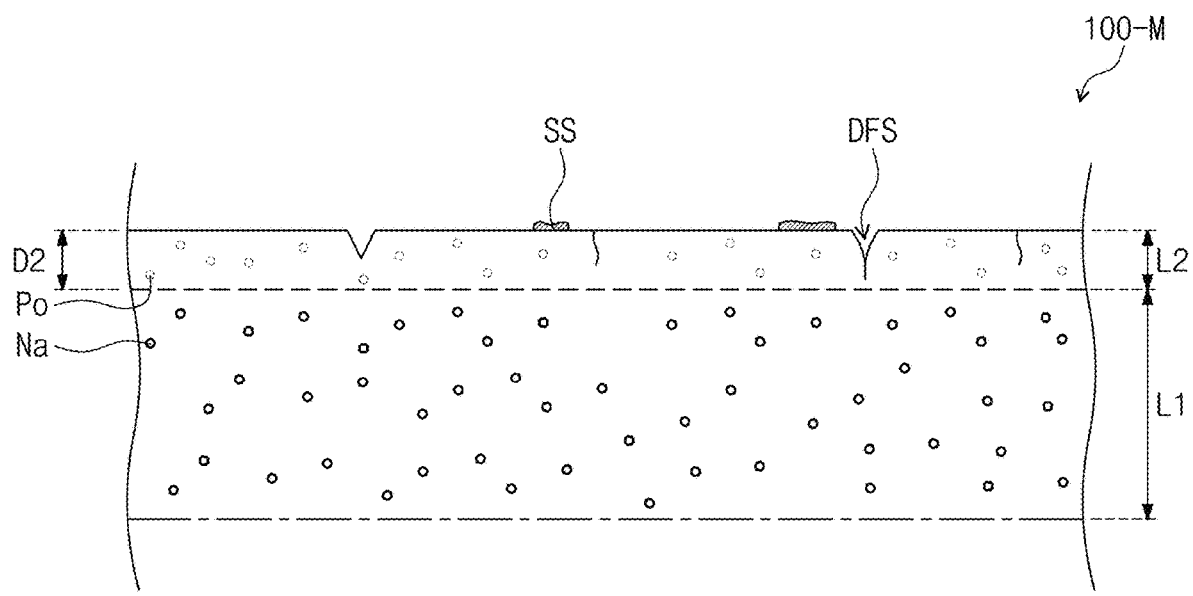

Then, referring to FIG. 4, the window 100 is formed after a washing operation (S200) of washing the initial window 100-I. The washing operation (S200) may include an acid washing operation (S210) and a base washing operation (S220). FIGS. 5C and 5D illustrate cross-sectional views corresponding to the acid washing operation (S210) for ease of description and illustrate a region corresponding to FIG. 5B.

Referring to FIGS. 5C and 5D, the acid washing operation (S210) may be to provide the initial window 100-I into an acidic environment. The acidic environment represents an environment having a hydrogen exponent (hereinafter, pH) value less than 7, and may be provided in various states such as liquid, gas, or solid as long as it has acidity.

In the embodiment, the acid washing operation (S210) may proceed by immersing the initial window 100-I into an acidic solution WS1. The acidic solution WS1 according to an embodiment of the present invention may be a strong acid having a pH of 2 or lower. For example, the acidic solution WS1 may include at least one of nitric acid ($HNO_3$), sulfuric acid ($H_2SO_4$), and hydrochloric acid (HCl). Here, a pH value of the acidic solution WS1 may be measured to be about 2.5 or less at room temperature.

The acidic solution WS1 reacts with the initial window 100-I, and accordingly, an intermediate layer L2 may be formed in the initial window 100-I. Thus, as illustrated in FIG. 5D, the initial window 100-I is subjected to the acid washing operation (S210) and then may be formed to be an intermediate window 100-M which is divided into an intermediate layer L2 and a base layer L1. The intermediate layer L2 may be formed surrounding the surface of the base layer L1.

The intermediate layer L2 may be formed by removing at least a portion of the alkali metal ions Na of the initial window 100-I through the reaction with the acidic solution WS1. Here, positions Po, from which the alkali metal ions Na move out, may be filled with hydrogen ions provided from the acidic solution WS1 or may be provided as voids (or pores).

As the alkali metal ions Na are removed from the initial window 100-I, a content ratio of silicon to alkali metal ions within the intermediate layer L2 may be greater than a content ratio of silicon to alkali metal ions within the base layer L1. The content ratio of silicon to alkali metal ions within the base layer L1 may substantially correspond to a content ratio of silicon to alkali metal ions within the initial window 100-I.

A thickness D2 of the intermediate layer L2 may be at least equal to or greater than the thickness D1 in which the defects DFS illustrated in FIG. 5B are formed. Accordingly, through a subsequent process of removing the intermediate layer L2, the defects DFS may also be stably removed. This will be described later in detail.

FIG. 6 may correspond to a change in thickness of the intermediate layer L2 during the acid washing operation (S210). FIG. 6 illustrates graphs PLT1, PLT2, and PLT3 each illustrating a change in thickness over time at different temperature conditions during the acid washing operation (S210). A first graph PLT1 represents a change in thickness of the intermediate layer over time when immersed into the acidic solution under the temperature condition of 40° C., a second graph PLT2 represents a change in thickness of the intermediate layer over time when immersed into the acidic solution under the temperature condition of 50° C., and a third graph PLT3 represents a change in thickness of the intermediate layer over time when immersed into the acidic solution under the temperature condition of 60° C.

Referring to the first to third graphs PLT1, PLT2, and PLT3, it may be understood that the thickness of the intermediate layer L2 increases as time passes. Also, it may be understood that as the acid washing operation 210 is performed under a higher temperature condition, the thickness of the intermediate layer L2 becomes increased. According to the present invention, as the temperature condition of the acid washing operation (S210) becomes higher, a formation speed of the intermediate layer L2 may increase, but vapor is likely to occur. As the temperature condition of the acid washing operation (S210) becomes lowered, a formation speed of the intermediate layer L2 may decrease, but the thickness of the intermediate layer L2 may be finely controlled. Thus, the thickness of the intermediate layer L2 may be easily controlled by controlling the temperature condition and time condition of the acid washing operation (S210).

For example, in a case where the acid washing operation (S210) is performed for about 5 minutes to about 10 minutes under the temperature condition of about 60° C. to about 65° C., the intermediate layer L2 having a thickness range of 200 nm to 500 nm may be formed. Here, this is merely illustrated as an example, and a process time of the acid washing operation (S210) may be designed to various times as long as it is approximately 5 minutes to about 30 minutes. The thickness D2 of the intermediate layer L2 according to the present invention may be variously controlled to correspond to the thickness D1 in which the defects DFS are formed, and the embodiment is not limited to any one embodiment.

Figure 5E:
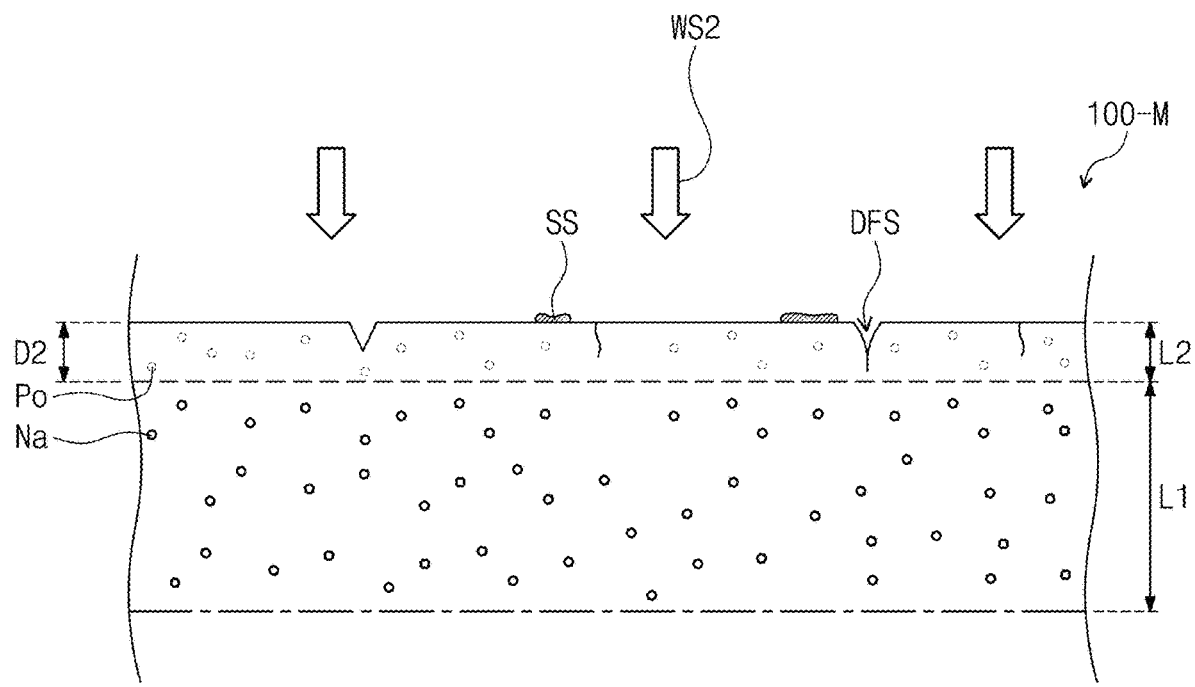
Figure 5F:
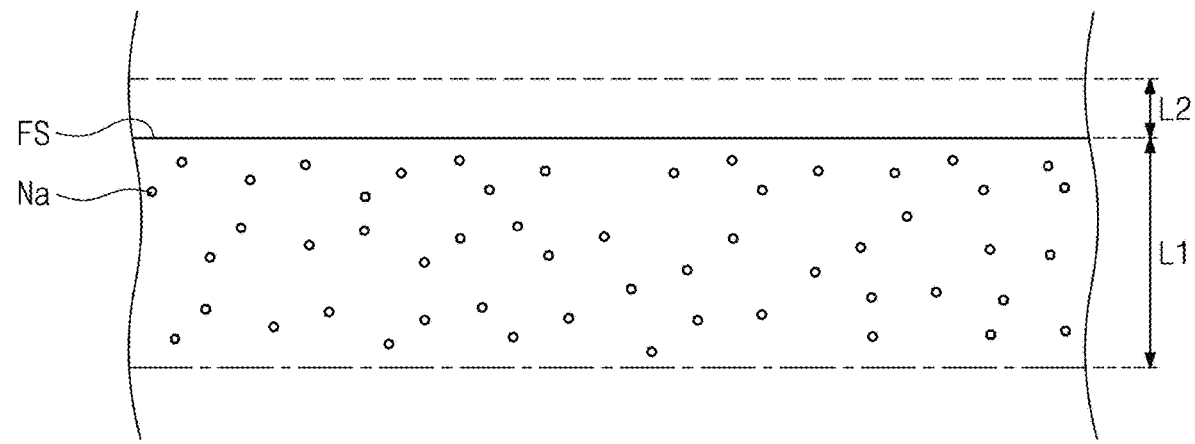
Figure 5G:
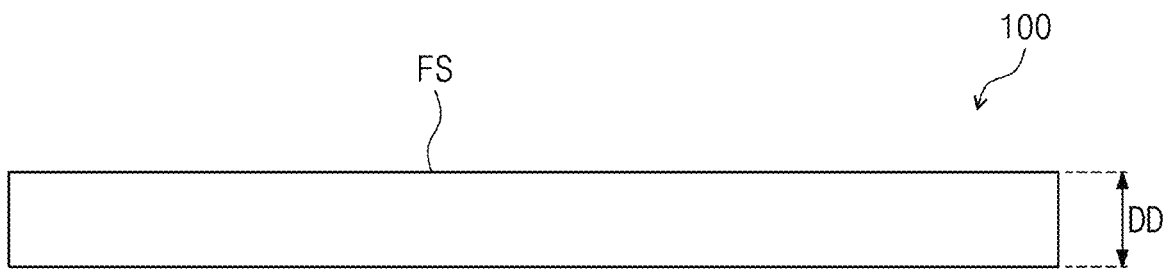

Referring to FIGS. 5E to 5G, the window 100 may be formed through a base washing operation (S220). The base washing operation (S220) may be to provide the intermediate window 100-M into a basic environment. The basic environment represents an environment having a pH value greater than 7, and may be provided in various states such as liquid, gas, or solid as long as it is a base.

In the embodiment, the base washing operation (S220) may proceed by immersing the intermediate window 100-M into a basic solution WS2. The basic solution WS2 according to an embodiment of the present invention may be a strong base having a pH of 13 or higher. For example, the basic solution WS2 may include sodium hydroxide (NaOH) or potassium hydroxide (KOH).

The window 100 has a predetermined thickness DD as illustrated in FIG. 5G. In the embodiment, the thickness DD of the window 100 may be less than the thickness DD-S of the initial window 100-I illustrated in FIG. 5A. The thickness DD of the window 100 may correspond to the thickness of the base layer L1.

The basic solution WS2 reacts with the intermediate window 100-M, and the intermediate layer L2 is removed from the intermediate window 100-M as illustrated in FIG. 5F, whereby the window 100 may be formed. Here, the defects DFS or the foreign substances SS present in the initial window 100-I (see FIG. 5A) may be removed from the base layer L1 together with the intermediate layer L2.

Accordingly, the window 100 may have a surface FS with no defects DFS or foreign substances SS. The surface FS of the window 100 may substantially correspond to the surface of the base layer L1. The surface roughness of the window 100 may be within a range of 0.2 nm to 3 nm. The surface roughness of the window 100 may be less than the surface roughness of the initial window 100-I or the surface roughness of the intermediate window 100-M.

FIG. 7A corresponds to a scanning electron microscope image of the surface of the intermediate window 100-M illustrated in FIG. 5C. That is, FIG. 7A may correspond to the microscopic image of a surface FS-C of the intermediate layer L2. FIG. 7B may correspond to a scanning electron microscope image of the surface FS of the window 100 illustrated in FIG. 5G.

Referring to FIGS. 7A and 7B, the surface roughness of the window 100 may be less than the surface roughness of the intermediate layer L2. Due to the alkali metal ions eluted out of the intermediate layer L2 during the acid washing operation (S210), the intermediate layer L2 may include a plurality of voids V1 as illustrated in FIG. 7A. The voids V1 may be a main reason for the increase in surface roughness of the intermediate layer L2.

The intermediate layer L2 may be referred to as a second layer and the base layer L1 may be referred to as a first layer. The second layer L2 may have a higher silicon content than the first layer L1. The second layer L2 may have relatively more voids V1 than the first layer L1.

As illustrated in FIG. 7B, the base solution may easily permeate inside the intermediate layer L2 through the voids V1 during the base washing operation (S220), and thus, the intermediate layer L2 may be easily removed during the base washing operation (S220). Here, the defects DFS or foreign substances SS present in the intermediate layer L2 may be stably removed together with the intermediate layer L2. Accordingly, as illustrated in FIG. 7B, the window 100 may have the lowered surface roughness.

As illustrated above, as the thickness of the intermediate layer L2 becomes greater than or equal to the thickness D1 in which the defects DFS are formed, the defects DFS may be easily removed during the acid washing and base washing operation (S200), which may combined to be referred to as the washing operation.

According to the present invention, only through the washing operation (S200), the surface FS of the window 100 may be formed, from which the defects DFS acting as a propagation path of cracks due to external impact or the foreign substances SS causing a chemical reaction or physical damage are removed. Also, according to the present invention, through the washing operation (S200), the surface FS of the window 100 may have a low roughness, and thus, a post-polishing process may be omitted. Accordingly, a process to manufacture the window 100 may be simplified, and the window 100 having improved reliability may be easily formed.

Figure 8:
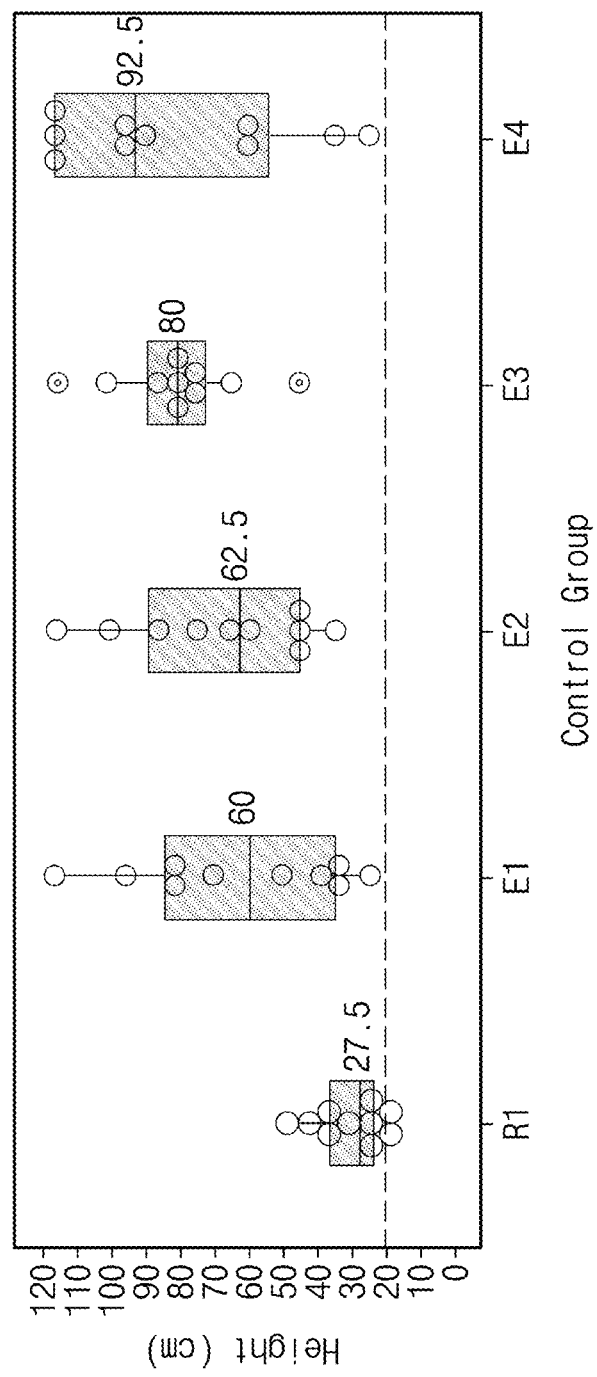
FIG. 8 is a graph illustrating the strength of the window according to an embodiment of the present invention.

FIG. 8 is a graph illustrating the strength of the window according to an embodiment of the present invention. FIG. 8 illustrates each of strength evaluation results for a comparative example R1 and first to fourth embodiments E1, E2, E3, and E4 according to the present invention for ease of description. FIG. 8 illustrates result values obtained by a ball drop test which is one of impact resistance evaluating methods. In the embodiment, a steel ball having a weight of 150 g was used. Hereinafter, the present invention will be described with reference to FIG. 8.

As illustrated in FIG. 8, the comparative example R1 has result values distributed in a range of about 20 cm to about 40 cm and has impact resistance against a ball that drops from an average height of about 27.5 cm. The comparative example R1 may represent a window which has not been subjected to the washing operation (S200, see FIG. 4) according to an embodiment of the present invention.

The first to fourth embodiments E1, E2, E3, and E4 may represent windows which have been subjected to the washing operation (S200) according to an embodiment of the present invention. The first embodiment E1 may represent a window which has been subjected to the acid washing operation (S210, see FIG. 4) for 5 minutes at a temperature of about 60° C. and then has been subjected to the base washing operation (S220, see FIG. 4) for 5 minutes at a temperature of about 60° C. Here, it was illustrated that the first embodiment E1 has impact resistance against a ball that drops from an average height of about 60 cm.

The second embodiment E2 may represent a window which has been subjected to the acid washing operation (S210) for 15 minutes at a temperature of about 50° C. and then has been subjected to the base washing operation (S220) for 15 minutes at a temperature of about 50° C. Here, it is illustrated that the second embodiment E2 has impact resistance against a ball that drops from an average height of about 62.5 cm.

The third embodiment E3 may represent a window which has been subjected to the acid washing operation (S210) for 15 minutes at a temperature of about 50° C. and then has been subjected to the base washing operation (S220) for 20 minutes at a temperature of about 50° C. Here, it is illustrated that the third embodiment E3 has impact resistance against a ball that drops from an average height of about 80 cm.

The fourth embodiment E4 may represent a window which has been subjected to the acid washing operation (S210) for 30 minutes at a temperature of about 50° C. and then has been subjected to the base washing operation (S220) for 30 minutes at a temperature of about 50° C. Here, it is illustrated that the second embodiment E4 has impact resistance against a ball that drops from an average height of about 92.5 cm.

It is illustrated that the first to fourth embodiments E1, E2, E3, and E4 have improved impact resistance compared to comparative example R1. That is, according to the present invention, as the combined washing operation (S200) is further performed, a window having improved durability and strength may be easily provided.

Here, a change according to conditions of the washing operation (S200) will be described in more detail by comparing the results between the first to fourth embodiments E1, E2, E3, and E4.

Referring to the first and second embodiments E1 and E2, the second embodiment E2 was evaluated to have slightly increased impact resistance compared to the first embodiment E1. The second embodiment E2 has been subjected to the acid washing operation (S210) and the base washing operation (S220) at a lower temperature but for a longer period of time compared to the first embodiment E1.

According to the present invention, it may be understood that the second embodiment E2 has formed thicker intermediate layer than the first embodiment E1. As described above, a formation speed of the intermediate layer may increase as the temperature of the acid washing operation (S210) increases, but it may be understood that the second embodiment E2 has been subjected to the acid washing operation (S210) for the longer period of time and thus has formed the intermediate layer having the sufficient thickness compared to the first embodiment E1. Accordingly, defects, which may deteriorate the impact resistance, are sufficiently removed in the second embodiment E2, and thus, relatively high impact resistance may be obtained. Here, taking into consideration that there is no significant difference between the first and second embodiments E1 and E2, the window having sufficient strength may be formed through only the conditions of the washing operation (S200) performed on the fourth embodiment E4. The length of the graphs representing R1, E1, E2, E3, and E4 along the height direction represent a variation in result values for a given height range.

Referring to the second and third embodiments E2 and E3, the third embodiment E3 was evaluated to have higher impact resistance compared to the second embodiment E2. Also, it was illustrated that the third embodiment E3 has small variation in result values compared to the other embodiments E1, E2, and E4. The third embodiment E3 has been subjected to the same acid washing operation (S210) as the second embodiment E2, but has been subjected to the base washing operation (S220) for a longer period of time. variation in result values.

According to the present invention, an amount of the intermediate layer to be removed may be different between the third embodiment E3 and the second embodiment E2. The second embodiment E2 is subjected to the base washing operation (S220) for a relatively shorter period of time, and thus, a portion of the intermediate layer formed during the acid washing operation (S210) may not be removed but remain. The remaining intermediate layer may affect the impact resistance. The third embodiment E3 has been subjected to the base washing operation (S220) for a longer period of time 20 minutes, and thus, all of the formed intermediate layer may be removed to exhibit the improved strength.

Referring to the third and fourth embodiments E3 and E4, the fourth embodiment E4 was evaluated to have the improved impact resistance compared to the third embodiment E3. The fourth embodiment E4 has been subjected to the acid washing operation (S200) at the same temperature as the third embodiment E3 but for a longer period of time than the third embodiment E3.

According to the present invention, it may be understood that the fourth embodiment E4 has formed a thicker intermediate layer than that of the third embodiment E3. Also, the fourth embodiment E4 has been subjected to the base washing operation (S220) for a longer period of time than the third embodiment E3, and thus, it may be understood that a thicker intermediate layer than the third embodiment E3 has been formed but entirely removed during the base washing operation (S220). Accordingly, defects, which may deteriorate the impact resistance, are sufficiently removed in the fourth embodiment E4, and thus, relatively high impact resistance may be obtained.

According to the present invention, the intermediate layer having the thickness sufficient to remove the defects is formed through the acid washing operation, and the intermediate layer is removed through the base washing operation, whereby the window having the improved strength may be provided. Also, according to the present invention, windows having various impact resistance may be easily secured by designing the temperature conditions or time conditions of the combined washing operation. Accordingly, the window may be provided, which simplifies processes and has the improved strength.

Figure 9:
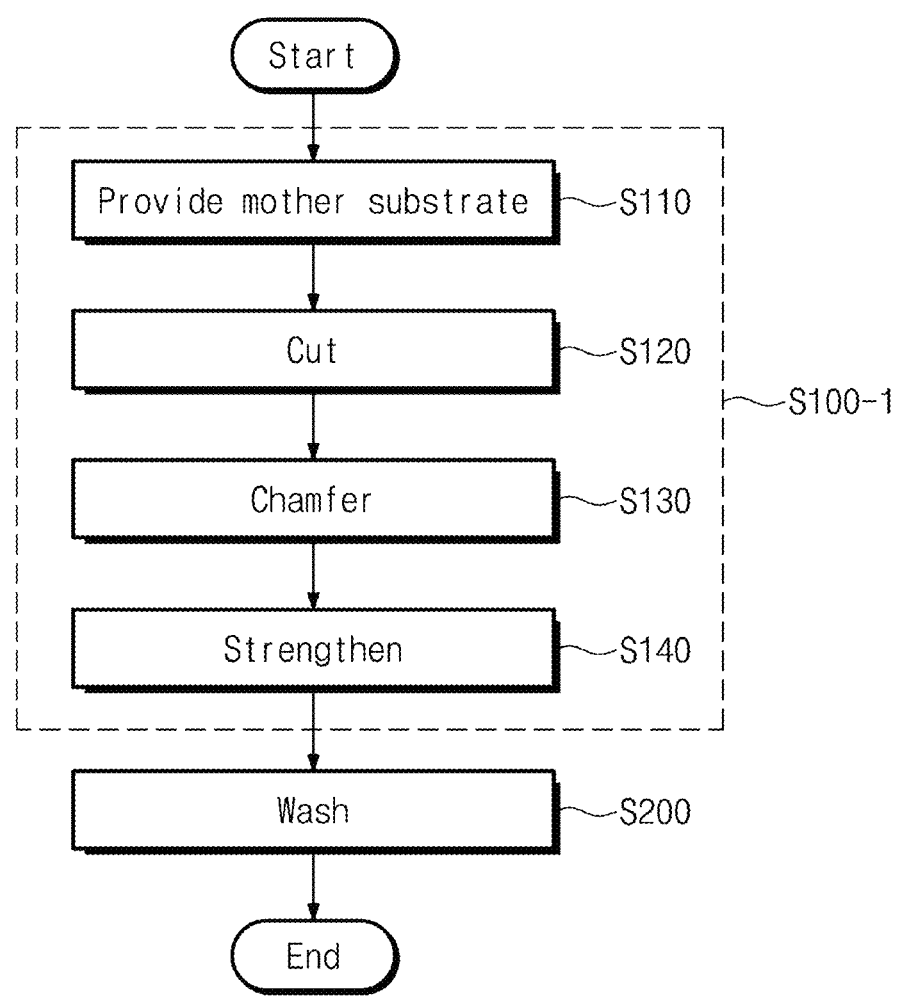
FIG. 9 is a flowchart illustrating a method of manufacturing a window according to an embodiment of the present invention.
Figure 10A:
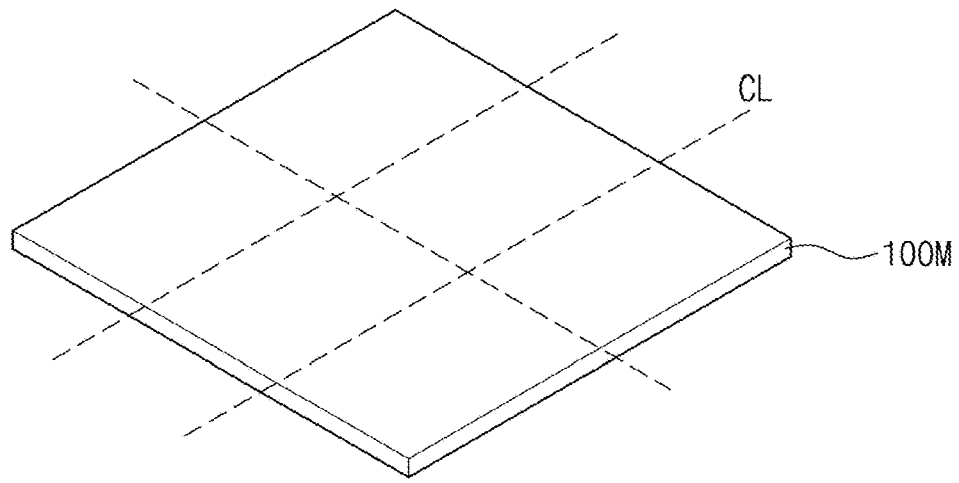
FIGS. 10A, 10B, and 10C are perspective views illustrating a method of manufacturing a window according to an embodiment of the present invention.
Figure 10B:
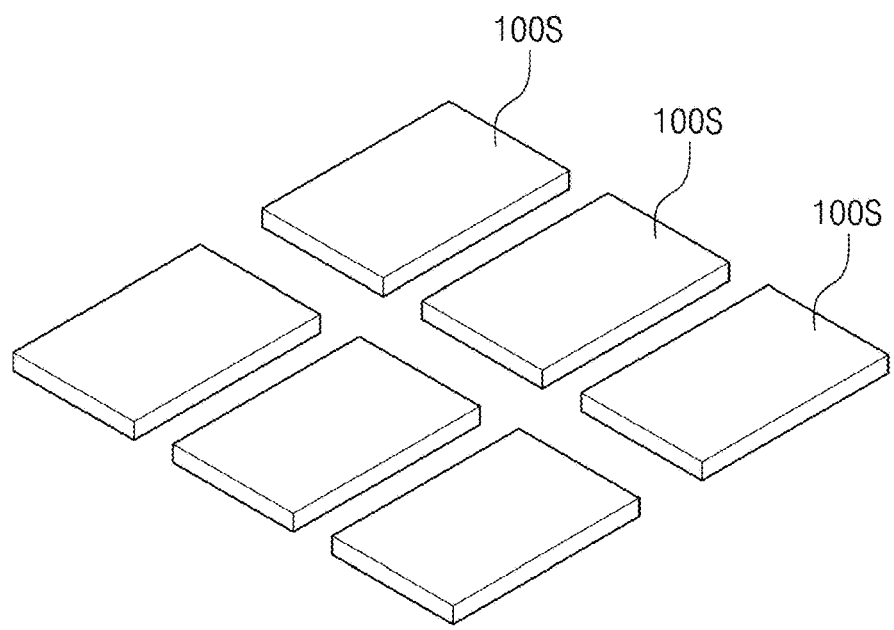
Figure 10C:
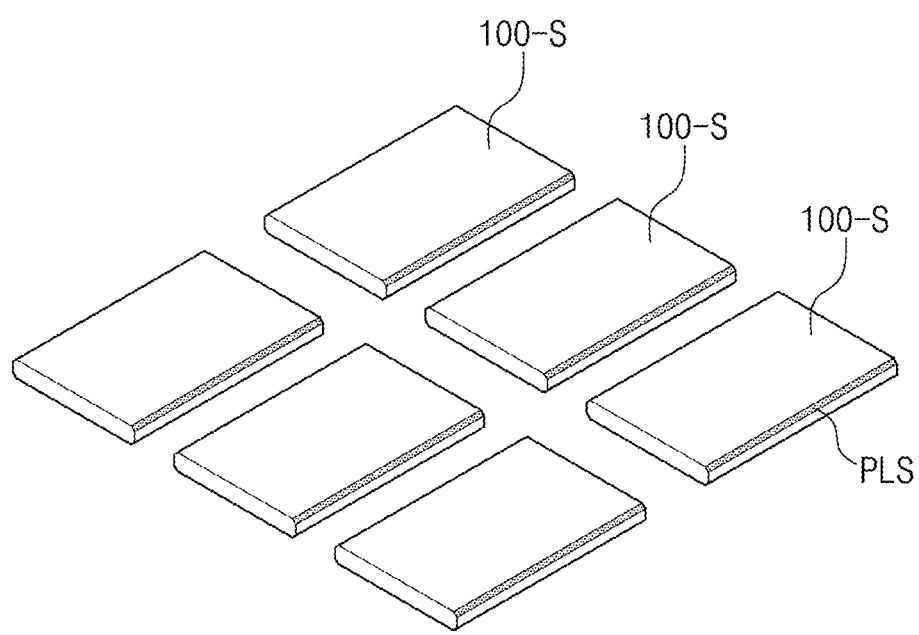
Figure 11A:
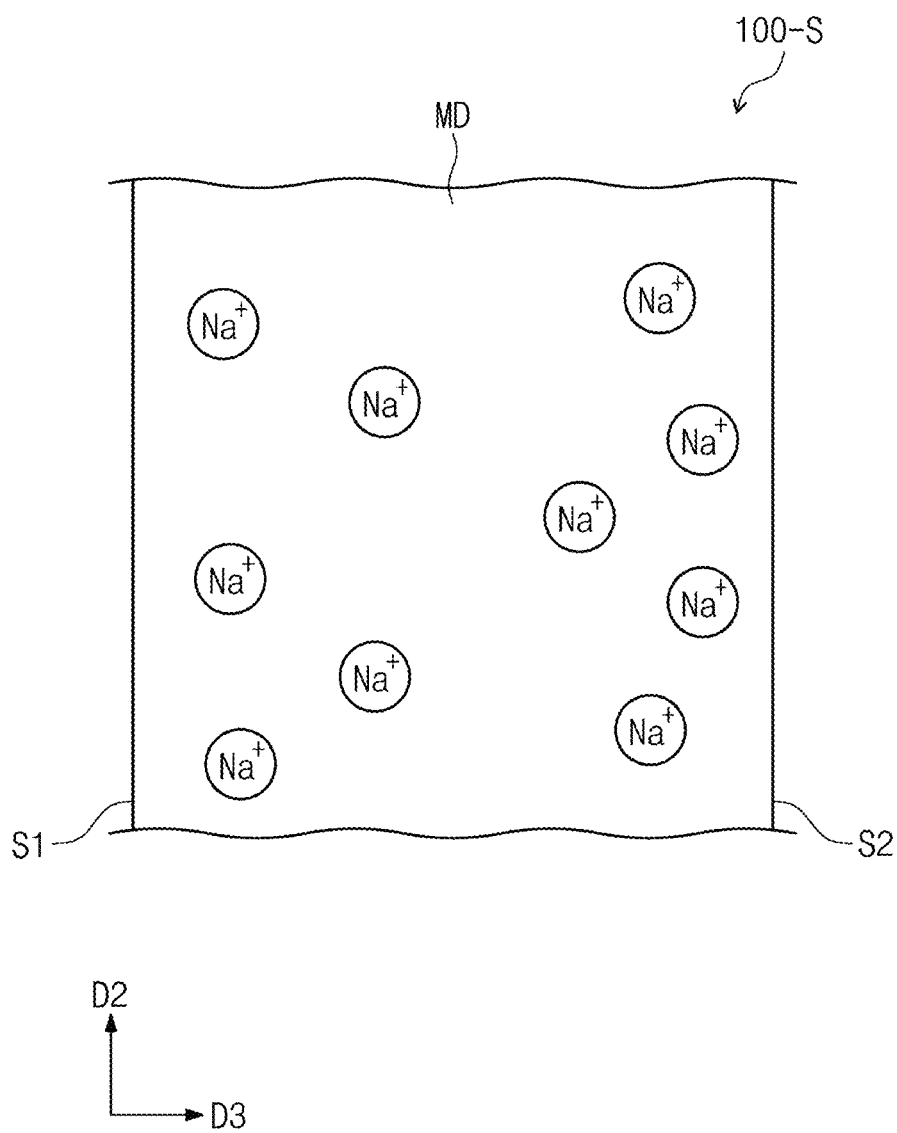
Figure 11B:
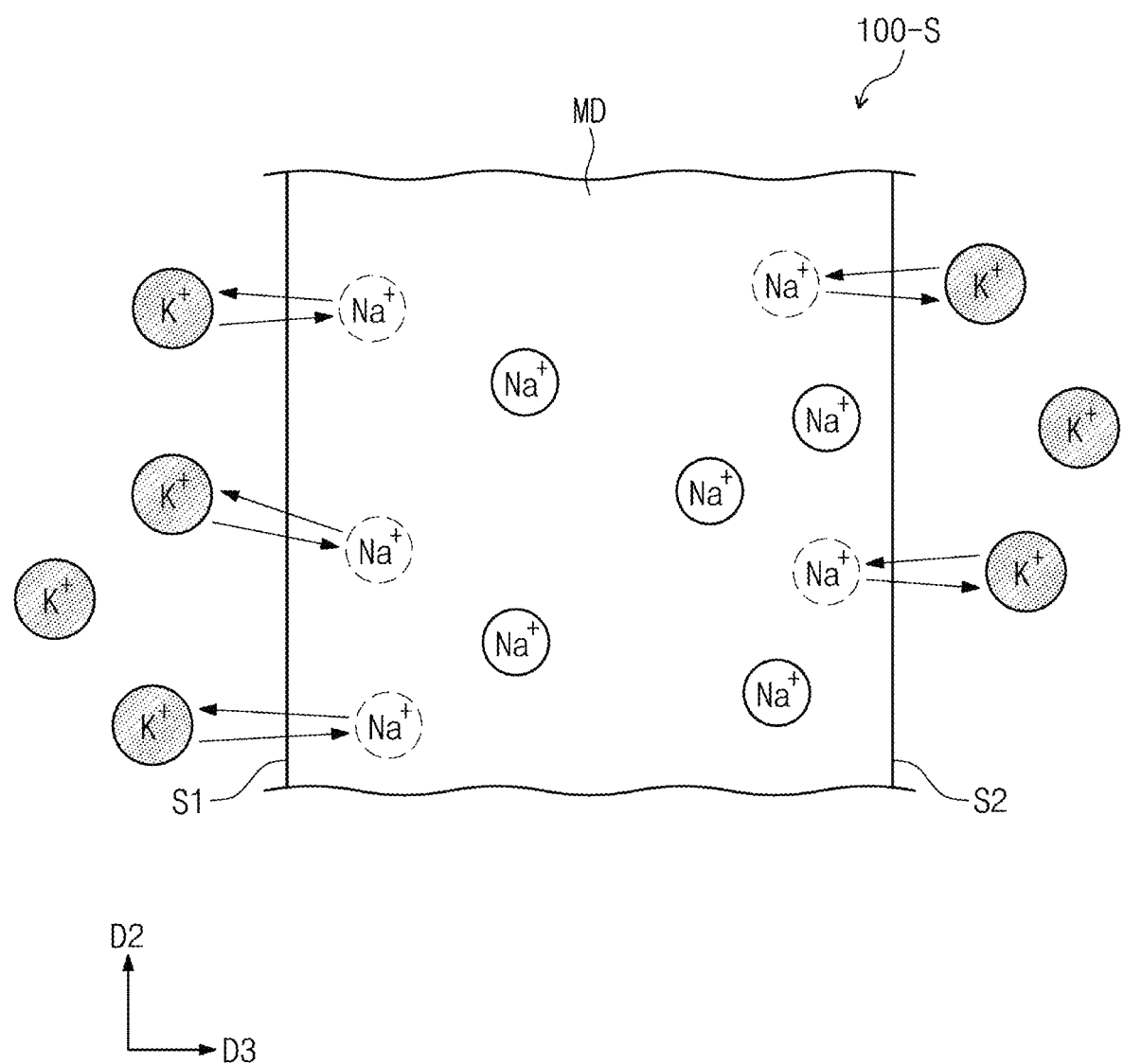
Figure 11C:
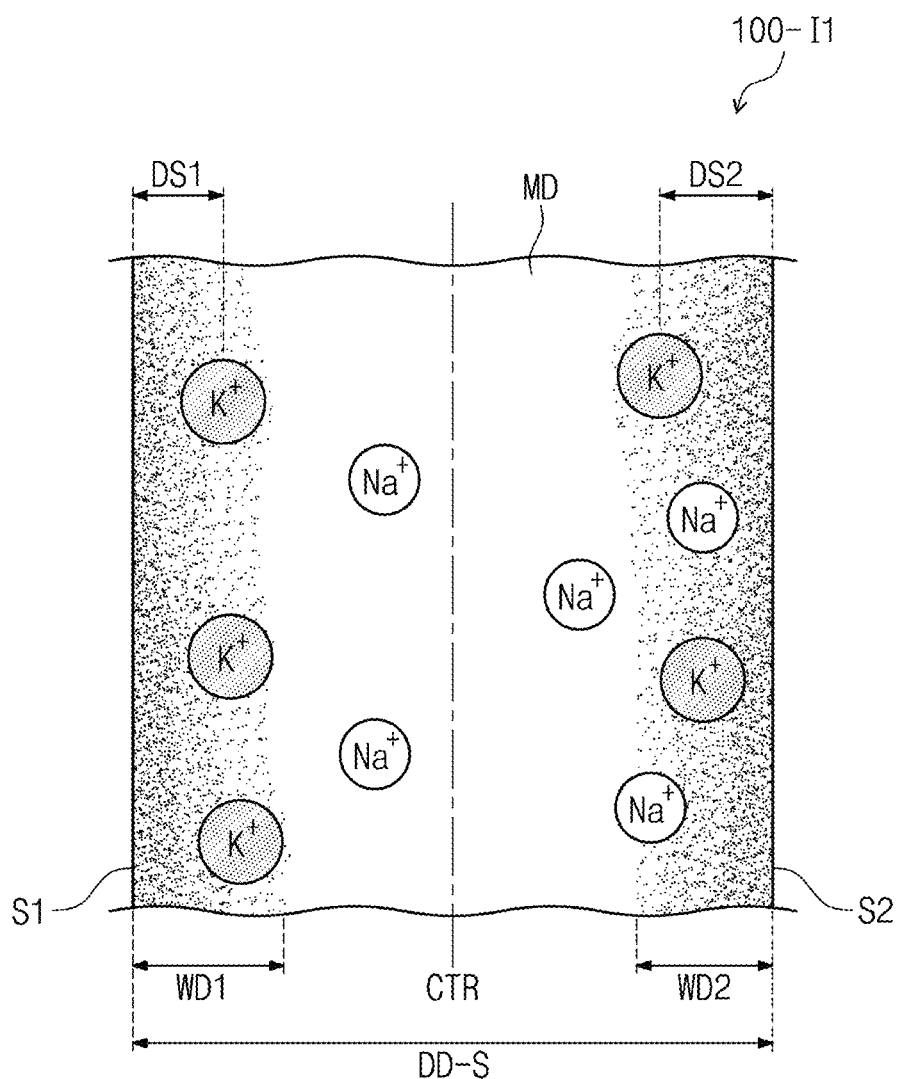

FIG. 9 is a flowchart illustrating a method of manufacturing a window according to an embodiment of the present invention. FIGS. 10A to 10C are perspective views illustrating a method of manufacturing a window according to an embodiment of the present invention. FIGS. 11A to 11C are cross-sectional views illustrating a method of manufacturing a window according to an embodiment of the present invention. Hereinafter, the present invention will be described with reference to FIGS. 9 to 11C. Here, the same reference numerals may be given to the same components as those illustrated in FIGS. 1 to 8, and their duplicated descriptions will be omitted.

As illustrated in FIG. 9, an initial window providing operation (S100-1) may include a mother substrate providing operation (S110), a cutting operation (S120), a chamfering operation (S130), and a strengthening operation (S140). FIGS. 10A to 10C schematically illustrate the mother substrate providing operation (S110), the cutting operation (S120), and the chamfering operation (S130).

Referring to FIGS. 10A and 10B, a mother substrate 100M may be cut to form a plurality of unit substrates 100S. The mother substrate 100M is cut along a virtual cutting lines CL formed on the mother substrate 100M. The cutting operation (S120) may be performed using laser or knife.

Subsequently, as illustrated in FIG. 10C, the unit substrates 100S are chamfered to form a plurality of processed substrates 100-S. The edges of each of the unit substrates 100S are cut (chamfered) through the chamfering operation (S130), and thus, the processed substrates 100-S having inclined surfaces PLS may be formed.

FIGS. 11A to 11C schematically illustrate the strengthening operation (S140). Referring to FIG. 11A, an insulating substrate 100-S is provided. The insulating substrate 100-S may include glass. In the embodiment, the insulating substrate 100-S may correspond to any one of the processed substrates described above. In the embodiment, a portion of the insulating substrate 100-S is illustrated on a plane defined by a second direction D2 and a third direction D3 for ease of description.

The insulating substrate 100-S includes a first surface S1 and a second surface S2 which are opposed to each other in a thickness direction of the insulating substrate 100-S, i.e., the third direction D3. The insulating substrate 100-S may include a base material MD and a plurality of first ions Na+. In the embodiment, the first ions Na+ may include sodium ions. The first ions Na+ may be dispersed within the base material MD.

Here, the insulating substrate 100-S may include silicon oxide ($SiO_2$), aluminum oxide ($Al_2O_3$), lithium oxide ($Li_2O$), and alkali metal oxide, for example, sodium oxide ($Na_2O$) or potassium oxide ($K_2O$), and may also include phosphorus oxide ($P_2O_5$). The insulating substrate 100-S according to an embodiment of the present invention is not limited to a material and includes a glass substrate made of various materials, and the embodiment is not limited to any one embodiment.

Subsequently, as illustrated in FIG. 11B, the insulating substrate 100-S is immersed into a metal salt, and thus, the insulating substrate 100-S is strengthened. In the embodiment, the strengthening operation for the insulating substrate 100-S may be chemical strengthening. In particular, the insulating substrate 100-S may be strengthened through an ion exchange method.

The metal salt may include second ions K+ different from the first ions Na+. The second ions K+ may have a diameter greater than that of the first ions Na+. Here, the second ions may include alkali metal ions. In the embodiment, the second ions K+ may include potassium ions K+.

The second ions K+ may be substituted by the first ions Na+. In the embodiment, the substitution between the second ions K+ and the first ions Na+ may be made one-to-one. Accordingly, some of the alkali metal ions contained in the metal salt may be exchanged with the first ions Na+ and dispersed within a medium MD.

The metal salt may be provided in various forms. For example, the metal salt may be provided in the melted liquid phase of ion salt. Here, in the embodiment, the metal salt may be provided in the form of a single salt or a mixture of salts.

Referring to FIG. 11C, the insulating substrate 100-S may be formed into an initial window 100-I1 through the strengthening operation. The initial window 100-I1 may include a medium MD, and the second ions K+ and the first ions Na+ dispersed in the medium MD.

In the embodiment, internal stress may be generated in the initial window 100-I1 by the second ions K+. As described above, the second ions K+ have the diameter greater than that of the first ions Na+. Accordingly, the internal stress generated by the second ions K+ may be compressive stress. In FIG. 11C, for ease of description, the region, in which the compressive stress is generated, is illustrated as a shaded region, and a center line CTR passing through the center of the thickness DD-S is indicated by an alternate long and short dash line.

In the initial window 100-I1 as illustrated in FIG. 11C, the compressive stress due to the second ions K+ may be present within a range from the first surface S1 to a first depth WD1. Similarly, the compressive stress due to the second ions K+ may be present within a range from the second surface S2 to a second depth WD2. Each of the first depth WD1 and the second depth WD2 may substantially correspond to a depth of compression (DOC) of the initial window 100-I1. That is, the initial window 100-I1 may have a stress behavior illustrating the compressive stress in regions from the surfaces S1 and S2 to the first depth WD1 and the second depth WD2 and illustrating the tensile stress in regions beyond the first depth WD1 and the second depth WD2.

Here, FIG. 11C illustrates a maximum depth to which the second ions K+ permeate the inside the window 100. In particular, the depth to which the second ions K+ permeate from the first surface S1 is indicated by a first distance DS1, and the depth to which the second ions K+ permeate from the second surface S2 is indicated by a second distance DS2. Each of the first distance DS1 and the second distance DS2 may substantially correspond to a depth of layer (DOL) of the initial window 100-I1.

According to the present invention, through the strengthening operation (S140), the initial window 100-I1 may have regions which generate the compressive stress on the surfaces S1 and S2. Accordingly, the initial window 100-I1 may have improved strength and impact resistance compared to the insulating substrate 100-S.

Referring to FIG. 9 again, the initial window 100-I1 according to the present invention may be a substrate which has been subjected to the strengthening operation (S140). Subsequently, through a washing operation (S200), the initial window 100-I1 may have further improved strength. Here, in the embodiment, the window having the improved strength may be provided through only the washing operation (S200) without a separate post-polishing process after the strengthening operation (S140). Thus, according to the present invention, the window having the improved reliability may be easily provided. Also, the processes may be simplified, and process costs may be reduced.

Also, in the embodiment, the strengthening operation (S140) may be omitted. Here, one of the processed substrates 100-S illustrated in FIG. 10C may be provided to the washing operation (S200). Also, in the embodiment, the cutting operation (S120) or the chamfering operation (S130) may be omitted. The initial window providing operation (S100-1) according to embodiments of the present invention may provide various types of glass substrates, and the embodiments are not limited to any one embodiment.

Figure 12:
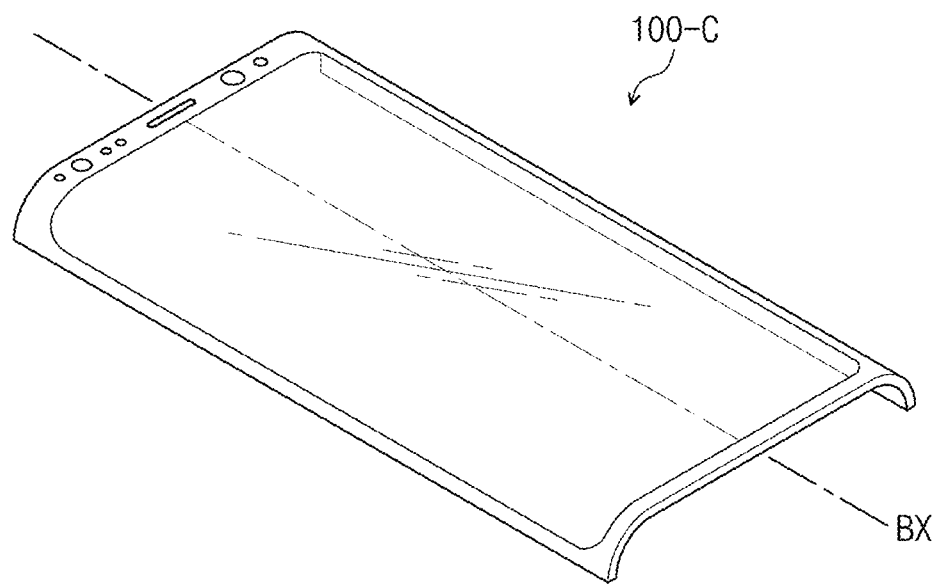
FIG. 12 is a perspective view illustrating a window according to an embodiment of the present invention.
Figure 13A:
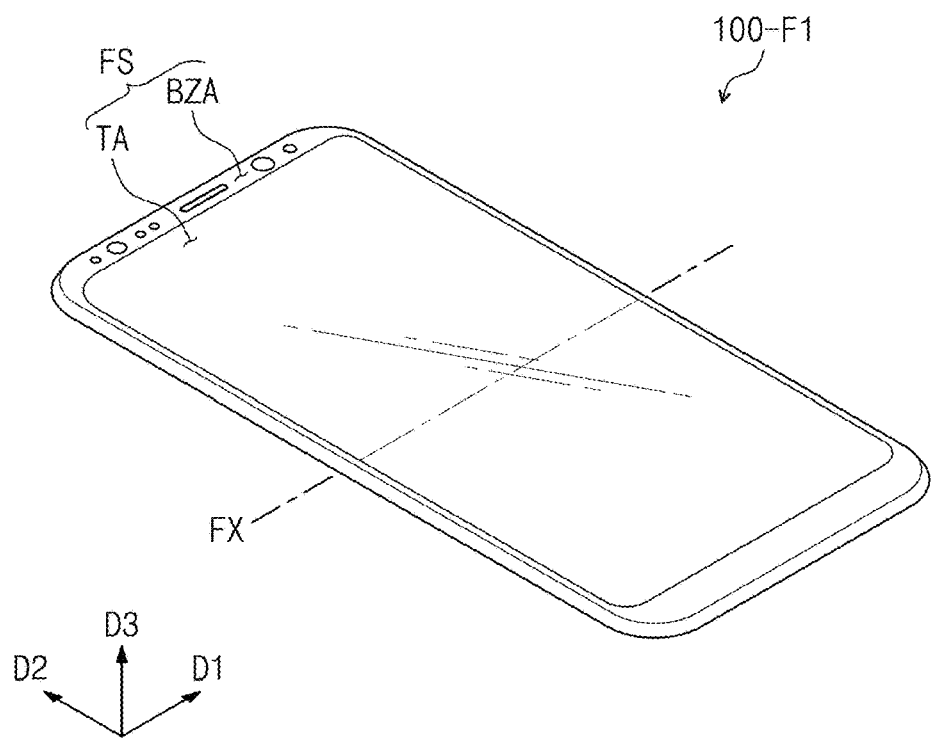
FIGS. 13A and 13B are perspective views illustrating windows according to an embodiment of the present invention.
Figure 13B:
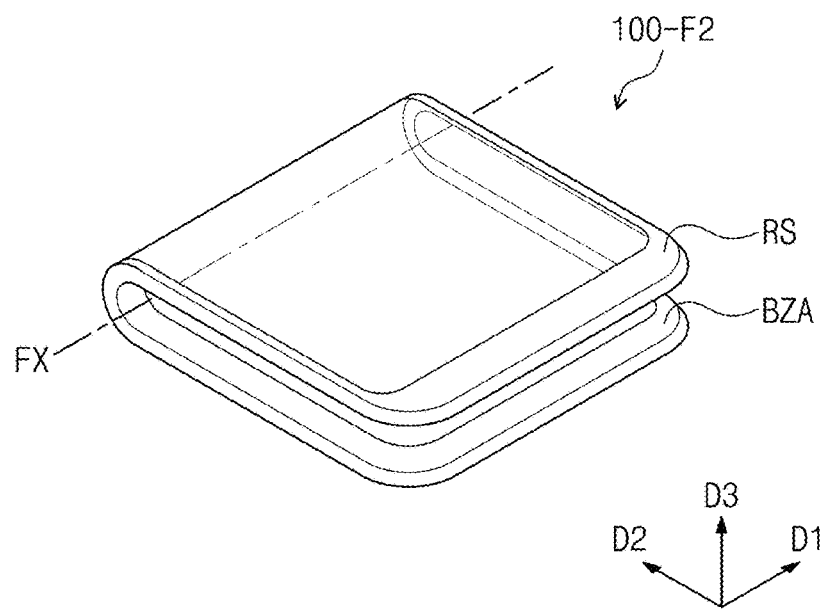

FIG. 12 is a perspective view illustrating a window according to an embodiment of the present invention. FIGS. 13A and 13B are perspective views illustrating windows according to an embodiment of the present invention. Hereinafter, the present invention will be described with reference to FIGS. 12 to 13B. Here, the same reference numerals may be given to the same components as those illustrated in FIGS. 1 to 11C, and their duplicated descriptions will be omitted.

As illustrated in FIG. 12, a window 100-C may have one side which is configured to bend about a predetermined bending axis BX. In the embodiment, the bending axis BX may extend in a second direction D2 and may be provided in a rear surface of the window 100-C. Here, both sides of the window 100-C, which extend in the second direction D2 and face each other in a first direction D1, may be bent about the bending axis BX. According to the present invention, the window 100-C having the bent shape may also have improved strength through the washing operation (S200, see FIG. 4) described above.

Also, as illustrated in FIGS. 13A and 13B, a window 100-F1 and a window 100-F2 may be folded or unfolded about a folding axis FX. For ease of description, FIG. 13A illustrates the window 100-F1 in an unfolded state, and FIG. 13B illustrates the window 100-F2 in a folded state.

The folding axis FX may extend in a first direction D1 and may be defined on a front surface FS of the window 100-F1. According to the present invention, the windows 100-F1 and 100-F2, of which shapes are deformable during use, may also have improved strength through the washing operation (S200).

According to the present invention, the sufficient impact resistance and strength may be achieved in the window 100-C having the various shapes and in the windows 100-F1 and 100-F2 having the deformable shapes. Accordingly, the window applicable to various electronic devices may be provided.

Although described with reference to exemplary embodiments of the present invention, it will be understood that various changes and modifications of the present invention may be made by one ordinary skilled in the art or one having ordinary knowledge in the art without departing from the spirit and technical field of the present invention as hereinafter claimed.

Hence, the technical scope of the present invention is not limited to the detailed description in the specification but should be determined only in accordance with the appended claims.

In using an electronic device, a window is essential to protect an electronic panel from external impact. Thus, the present invention relating to the window has high industrial applicability.

The invention claimed is:

1. A method of manufacturing a window comprising the operations of:
providing an initial window which comprises glass and comprises a lithium oxide and phosphorus oxide ($P_2O_5$); and
washing the initial window to manufacture the window, wherein the operation of washing comprises:
an acid washing operation of providing the initial window into an acidic environment; and
a base washing operation of providing the initial window, which has been subjected to the acid washing operation, into a basic environment, and
wherein a roughness of the window ranges from 0.2 nm to 3 nm, and
wherein the surface roughness of the window is lower than a roughness of the provided initial window.

2. The method of claim 1, wherein the acidic environment has a pH of 2 or lower.

3. The method of claim 2, wherein the acidic environment comprises an acidic solution including at least one of nitric acid ($HNO_3$), sulfuric acid ($H_2SO_4$), or hydrochloric acid (HCl).

4. The method of claim 3, wherein the acid washing operation is performed for about 5 minutes to 10 minutes at a temperature of 60° C. to 65° C.

5. The method of claim 1, wherein the basic environment has a pH of 13 or higher.

6. The method of claim 5, wherein the basic environment comprises a basic solution including at least one of sodium hydroxide (NaOH) or potassium hydroxide (KOH).

7. The method of claim 1, wherein the window, which has been subjected to the acid washing operation, comprises:
a first layer which includes an alkali metal and silicon that has a predetermined silicon content ratio with respect to the alkali metal; and
a second layer which is formed on a surface of the first layer and has a higher silicon content ratio than the first layer.

8. The method of claim 7, wherein the second layer is formed at a portion of the initial window, from which the alkali metal is eluted out during the acid washing operation.

9. The method of claim 8, wherein a thickness of the second layer is 200 nm to 500 nm.

10. The method of claim 9, wherein during the base washing operation the window is formed by removing the second layer from the first layer.

11. The method of claim 1, wherein a surface roughness of the window, which has been subjected to the acid washing operation, is greater than or equal to a surface roughness of the provided initial window.

12. The method of claim 1, wherein the operation of providing the initial window comprises operations of:
providing a glass substrate; and
strengthening the glass substrate,
wherein an operation of strengthening includes an ion exchange treatment, and
the operation of providing the initial window is to provide strengthened glass substrate.

13. The method of claim 12, wherein the operation of providing the initial window further comprises the operations of:
providing a mother substrate;
forming a plurality of unit substrates by cutting the mother substrate; and
chamfering side surfaces of the unit substrates,
wherein the provided initial window is one of the unit substrates which have been subjected to the operation of chamfering.

14. A method of manufacturing a window, the method comprising the operations of:
chemically strengthening a glass substrate so that a first initial substrate is formed;
wherein the glass substrate comprises a lithium oxide and phosphorus oxide ($P_2O_5$);
washing the first initial substrate with an acidic solution by immersing the first initial substrate into the acidic solution so that a second initial substrate is formed; and
washing the second initial substrate with a basic solution by immersing the second initial substrate into the basic solution so that a window is formed,
wherein a roughness of the window ranges from 0.2 nm to 3 nm, and
wherein the surface roughness of the window is lower than a roughness of the first initial substrate.

15. The method of claim 14, wherein the operation of chemically strengthening does not comprise potassium carbonate ($K_2CO_3$), sodium carbonate ($Na_2CO_3$), potassium bicarbonate ($KHCO_3$), sodium bicarbonate ($NaHCO_3$), potassium phosphate ($K_3PO_4$), sodium phosphate ($Na_3PO_4$), potassium sulfate ($K_2SO_4$), sodium sulfate ($Na_2SO_4$), and potassium hydroxide (KOH).

16. The method of claim 15, wherein the second initial substrate is formed by eluting out an alkali metal from the first initial substrate.

17. The method of claim 16, wherein the second initial substrate comprises:
a first layer, which has substantially the same content ratio of silicon to the alkali metal as the first initial substrate; and
a second layer, which is formed on a surface of the first layer and has a higher content ratio of the silicon to the alkali metal than the first layer.

18. The method of claim 17, wherein the second layer has more voids than the first layer.

19. The method of claim 17, wherein the window is formed by removing the second layer from the second initial substrate.

* * * * *